US012699851B2

(12) United States Patent
Narechania et al.

(10) Patent No.: US 12,699,851 B2
(45) Date of Patent: Aug. 4, 2026

(54) DATA IDENTIFICATION AND EXTRACTION FROM UNSTRUCTURED DOCUMENTS

(71) Applicant: ADOBE INC., San Jose, CA (US)

(72) Inventors: Arpit Narechania, Atlanta, GA (US); Fan Du, Milpitas, CA (US); Atanu Sinha, Kodbisanahalli (IN); Nedim Lipka, Campbell, CA (US); Alexa F. Siu, Sunnyvale, CA (US); Jane Elizabeth Hoffswell, Seattle, WA (US); Eunyee Koh, Sunnyvale, CA (US); Vasanthi Holtcamp, Fremont, CA (US)

(73) Assignee: ADOBE INC., San Jose, CA (US)

( * ) Notice: Subject to any disclaimer, the term of this patent is extended or adjusted under 35 U.S.C. 154(b) by 423 days.

(21) Appl. No.: 18/185,547

(22) Filed: Mar. 17, 2023

(65) Prior Publication Data

US 2024/0311581 A1 Sep. 19, 2024

(51) Int. Cl.
| | |
|---|---|
| *G06F 16/583* | (2019.01) |
| *G06F 40/279* | (2020.01) |
| *G06F 40/30* | (2020.01) |
| *G06F 40/40* | (2020.01) |
| *G06V 30/19* | (2022.01) |
| *G06V 30/412* | (2022.01) |

(52) U.S. Cl.
CPC .......... *G06F 40/40* (2020.01); *G06F 16/5846* (2019.01); *G06F 40/279* (2020.01); *G06F 40/30* (2020.01); *G06V 30/19147* (2022.01); *G06V 30/412* (2022.01)

(58) Field of Classification Search
None
See application file for complete search history.

(56) References Cited

U.S. PATENT DOCUMENTS

| | | | | |
|---|---|---|---|---|
| 7,428,699 | B1 | 9/2008 | Kane et al. | |
| 7,644,361 | B2 | 1/2010 | Wu et al. | |
| 7,840,564 | B2 | 11/2010 | Holzgrafe et al. | |
| 8,285,074 | B2 * | 10/2012 | Saund ................ | G06V 30/1914 |
| | | | | 382/209 |

(Continued)

OTHER PUBLICATIONS

Barman, et al, "Ringer: Web Automation by Demonstration". Proceedings of the 2016 ACM SIGPLAN international conference on object-oriented programming, systems, languages, and applications, Nov. 2, 2016, pp. 748-764 (17 pages).

(Continued)

*Primary Examiner* — Amresh Singh
(74) *Attorney, Agent, or Firm* — F. CHAU & ASSOCIATES, LLC

(57) ABSTRACT

Aspects of the method, apparatus, non-transitory computer readable medium, and system include obtaining a document and an information element. The aspects further include identifying, from the document, an anchor element that has an anchor type and a relationship type, wherein the anchor type describes a structure of a set of anchor elements, and the relationship type describes a relationship between the anchor element and the information element. The aspects further include extracting information corresponding to the information element based on the anchor element, the anchor type, and the relationship type, and displaying the extracted information to a user.

20 Claims, 10 Drawing Sheets

(56) References Cited

U.S. PATENT DOCUMENTS

| | | | |
|---|---|---|---|
| 8,832,655 | B2 * | 9/2014 | Grechanik ............... G06F 8/71 |
| | | | 707/777 |
| 8,954,438 | B1 * | 2/2015 | Mao ...................... G06F 16/907 |
| | | | 707/737 |
| 10,628,525 | B2 * | 4/2020 | Fink ........................ G06V 30/40 |
| 11,200,073 | B1 * | 12/2021 | Voicu .................... G06F 3/0482 |
| 2003/0212664 | A1 | 11/2003 | Breining et al. |
| 2012/0124086 | A1 * | 5/2012 | Song .................... G06F 40/154 |
| | | | 707/769 |
| 2015/0106156 | A1 | 4/2015 | Chang et al. |
| 2018/0025436 | A1 | 1/2018 | Déjean |
| 2018/0101725 | A1 | 4/2018 | Schmidt |
| 2019/0384807 | A1 | 12/2019 | Dernoncourt et al. |
| 2020/0104350 | A1 | 4/2020 | Allen et al. |
| 2020/0160050 | A1 | 5/2020 | Bhotika et al. |
| 2021/0248153 | A1 | 8/2021 | Sirangimoorthy et al. |
| 2021/0264208 | A1 * | 8/2021 | Damodaran ............. G06N 5/02 |
| 2022/0043858 | A1 | 2/2022 | Rinehart et al. |
| 2022/0188509 | A1 | 6/2022 | Zeng et al. |
| 2022/0207268 | A1 | 6/2022 | Gligan et al. |
| 2023/0196813 | A1 | 6/2023 | Muthu et al. |
| 2024/0249543 | A1 | 7/2024 | Jayaram et al. |
| 2024/0303412 | A1 | 9/2024 | Evans et al. |

OTHER PUBLICATIONS

Beel, et al, "SciPlore Xtract: Extracting Titles from Scientific PDF Documents by Analyzing Style Information (Font Size)", Research and Advanced Technology for Digital Libraries. ECDL 2010, Lecture Notes in Computer Science, vol. 6273, Springer, Berlin, Heidelberg, Springer, Berlin, Heidelberg, 2010, pp. 413-416 (4 pages).

Cheng, et al, "One-shot Text Field Labeling using Attention and Belief Propagation for Structure Information Extraction", arXiv preprint: arXiv:2009.04153v1 [cs.CV] Sep. 9, 2020, 9 pages.

Dalvi, et al, "Automatic Wrappers for Large Scale Web Extraction", 37th International Conference on Very Large Data Bases, Aug. 29-Sep. 3, 2011, arXiv Preprint: arXiv:1103.2406v1 [cs.DB], 2011, pp. 219-230 (12 pages).

Déjean, et al, "A System for Converting PDF Documents into Structured XML Format", Document Analysis Systems VII, 7th International Workshop, DAS 2006, Lecture Notes in Computer Science, vol. 3872, Springer, Berlin, Heidelberg, Feb. 13, 2006, pp. 129-140 (13 pages).

Futrelle, et al, "Extraction, layout analysis and classification of diagrams in PDF documents", CHI '19: Proceedings of the Seventh International Conference on Document Analysis and Recognition (ICDAR'03), Aug. 3, 2003, 7 pages.

Goebel, et al, "A Methodology for Evaluating Algorithms for Table Understanding in PDF Documents", Conference: Proc. of the 12th ACM Symp. on Document Engineering, Sep. 4, 2009, 4 pages.

Hatsutori, et al, "Estimating Legal Document Structure by Considering Style Information and Table of Contents", New Frontiers in Artificial Intelligence: JSAI-isAI 2016 Workshops, Nov. 14, 2016, pp. 270-283 (14 pages).

Hoffswell, et al, "Interactive Repair of Tables Extracted from PDF Documents on Mobile Devices", CHI '19: Proceedings of the 2019 CHI Conference on Human Factors in Computing Systems, Apr. 18, 2019, pp. 1-13 (13 pages).

Lin, et al, "Mathematical Formula Identification in PDF Documents", 2011 International Conference on Document Analysis and Recognition, Sep. 18, 2011, pp. 1419-1423 (5 pages).

Liu, et al, "Multi-Task Deep Neural Networks for Natural Language Understanding", NIPS'20: Proceedings of the 57th Annual Meeting of the Association for Computational Linguistics, pp. 4487-4496, Jul. 28, 2019, 10 pages.

Oro, et al, "PDF-TREX: An Approach for Recognizing and Extracting Tables from PDF Documents", 10th International Conference on Document Analysis and Recognition, Jul. 26, 2009, pp. 906-910 (5 pages).

Parthasarathy, et al, "Landmarks and Regions: A Robust Approach to Data Extraction", arXiv preprint: arXiv:2204.05021v1 [cs.SE] Apr. 11, 2022, 17 pages.

Perez-Arriaga, et al, "TAO: System for Table Detection and Extraction from PDF Documents", Proceedings of the Twenty-Ninth International Florida Artificial Intelligence Research Society Conference, Mar. 30, 2016, pp. 591-596 (6 pages).

Rahman, et al, "Conversion of PDF Documents into HTML: A Case Study of Document Image Analysis", The Thirty-Seventh Asilomar Conference on Signals, Systems & Computers, Nov. 9, 2003, pp. 87-91 (5 pages).

Raza, et al, "Automated Data Extraction using Predictive Program Synthesis", AAAI Conference on Artificial Intelligence, Feb. 12, 2017, 9 pages.

Raza, et al, "Web data extraction using hybrid program synthesis: a combination of top-down and bottom-up Inference", Proceedings of the 2020 ACM SIGMOD International Conference on Management of Data, Jun. 11, 2020, 16 pages.

Satpal, et al, "Web Information Extraction Using Markov Logic Networks", WWW 2011, Mar. 28, 2011, 2 pages.

Shao, et al, "Recognition and Classification of Figures in PDF Documents", GREC'05: Proceedings of the 6th International conference on Graphics Recognition: ten Years Review and Future Perspectives, Aug. 25, 2005, pp. 231-242 (12 pages).

Yandrapally, et al, "Robust Test Automation Using Contextual Clues", 2014 International Symposium on Software Testing and Analysis, ISSTA 2014—Proceedings, Feb. 21, 2014, 19 pages.

Amar, et al., "Low-Level Components of Analytic Activity in Information Visualization", Information Visualization, IEEE Symposium on, Minneapolis, MN USA, Oct. 23, 2005, 7 pages.

Demiralp, et al., "Foresight: Recommending Visual Insights", arXiv preprint: arXiv:1707.03877v1 [cs.DB] Jul. 12, 2017, Proceedings of the VLDB Endowment, vol. 10, No. 12, 4 pages.

Goodman, et al., "PDF-to-Text Reanalysis for Linguistic Data Mining", Proceedings of the Eleventh International Conference on Language Resources and Evaluation (LREC 2018), May 2018, pp. 723-727.

Mitra, et al., "Facilitating Conversational Interaction in Natural Language Interfaces for Visualization", arXiv preprint:arXiv:2207.00189v3 [cs.HC] Aug. 12, 2022, pp. 1-6.

Nguyen, et al., "TabIQA: Table Questions Answering on Business Document Images", arXiv preprint: arXiv:2303.14935v1 [cs.CV] Mar. 27, 2023, 5 pages.

Narechania, et al., "NL4DV: A Toolkit for Generating Analytic Specifications for Data Visualization from Natural Language Queries", IEEE Transactions on Visualization and Computer Graphics, vol. 27, No. 2, Feb. 2021, pp. 369-379.

Srinivasan, et al., "Augmenting Visualizations with Interactive Data Facts to Facilitate Interpretation and Communication", IEEE Transactions on Visualization and Computer Graphics, vol. 25, No. 1, Jan. 2019, doi: 10.1109/TVCG.2018.2865145, pp. 672-681.

Office Action dated Nov. 14, 2025 in related U.S. Appl. No. 18/482,752.

Office Action dated Jul. 14, 2025 in related U.S. Appl. No. 18/482,754.

Pouramini, et al., "Web Data Extraction Using Textual Anchors", 2015 2nd International Conference on Knowledge-Based Engineering and Innovation (KBEI), Nov. 5-6, 2015, pp. 1124-1129.

Wang, et al.,, "DocStruct: A Multimodal Method to Extract Hierarchy Structure in Document for General Form Understanding", arXiv preprint arXiv:2010.11685v1 [cs,CV] Oct. 15, 2020, 11 pages.

Aggarwal, et al., "Form2Seq: A Framework for Higher-Order Form Structure Extraction", arXiv preprint arXiv:2107.04419v1 [cs.LG] Jul. 9, 2021. 11 pages.

Office Action dated Nov. 14, 2025 in related U.S. Appl. No. 18/482,754.

* cited by examiner

810 — OBTAIN DOCUMENTS FOR ANALYSIS AND DATA EXTRACTION

820 — CLUSTER SIMILAR DOCUMENTS

830 — AUTOMATICALLY IDENTIFY ANCHORS FOR POTENTIAL ENTITIES

840 — IDENTIFY ENTITIES OF INTEREST FOR EXTRACTION

850 — USER REVIEW OF IDENTIFIED ANCHORS

860 — EXTRACT RELEVANT DATA ACROSS ALL DOCUMENTS

870 — PROVIDE THE EXTRACTED DATA TO A USER

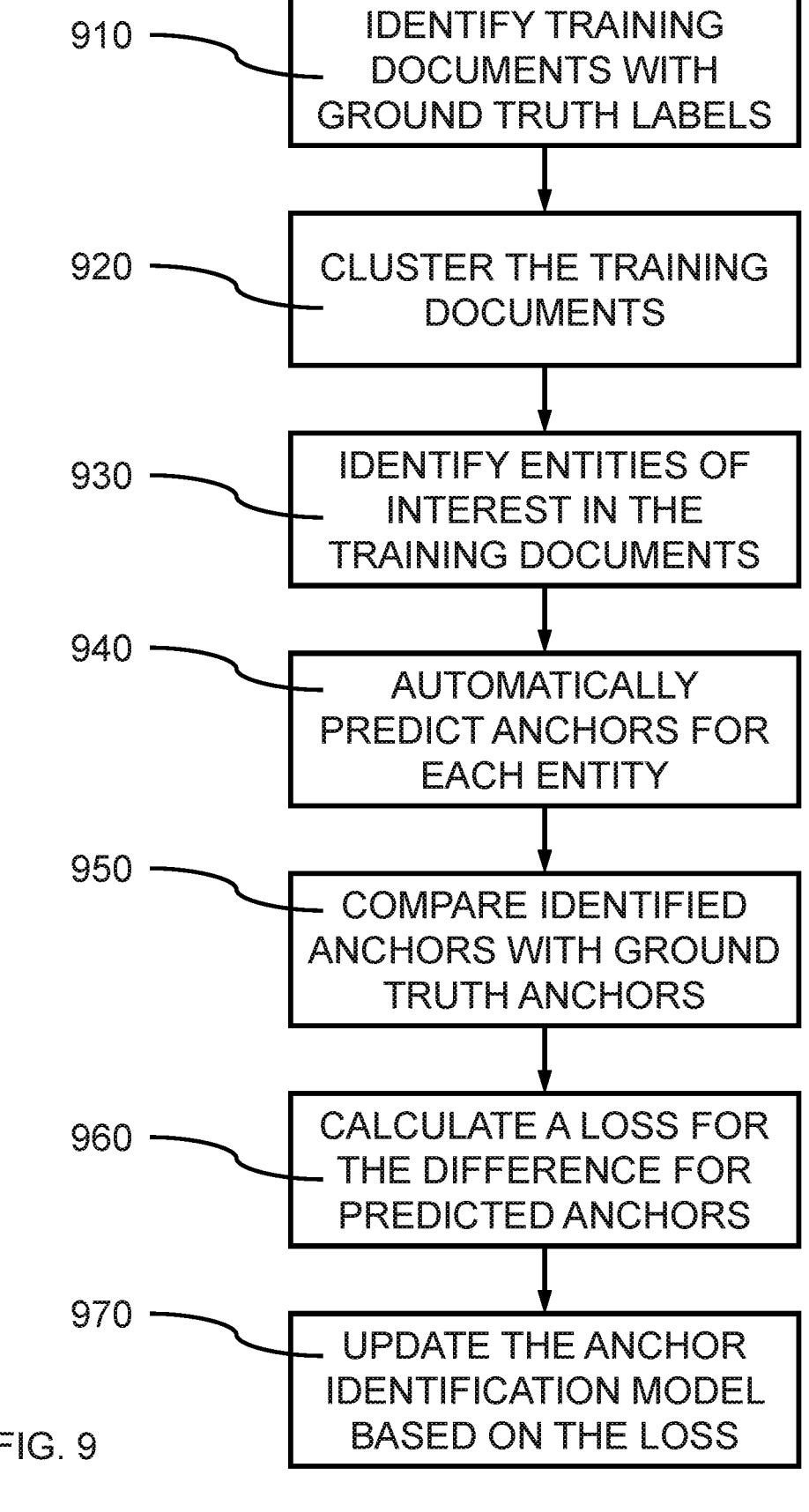

910 — IDENTIFY TRAINING DOCUMENTS WITH GROUND TRUTH LABELS

920 — CLUSTER THE TRAINING DOCUMENTS

930 — IDENTIFY ENTITIES OF INTEREST IN THE TRAINING DOCUMENTS

940 — AUTOMATICALLY PREDICT ANCHORS FOR EACH ENTITY

950 — COMPARE IDENTIFIED ANCHORS WITH GROUND TRUTH ANCHORS

960 — CALCULATE A LOSS FOR THE DIFFERENCE FOR PREDICTED ANCHORS

970 — UPDATE THE ANCHOR IDENTIFICATION MODEL BASED ON THE LOSS

FIG. 9

DATA IDENTIFICATION AND EXTRACTION FROM UNSTRUCTURED DOCUMENTS

BACKGROUND

The following relates to data extraction from semi-structured or unstructured documents.

Documents may have a particular structure that can be used to automatically identify and extract information. For example, a document might contain text, tables, images and other graphical elements, as well as informal relationships among document elements. Document extraction refers to the process of identifying these structural relationships between elements of a document, and extracting information from a document based on the identified relationships.

SUMMARY

Embodiments of the present disclosure provide an extraction algorithm that reduces or eliminates the problems of locating and extracting data from unstructured or semi-structured documents for further analysis.

A method, apparatus, non-transitory computer readable medium, and system for data extraction are described. One or more aspects of the method, apparatus, non-transitory computer readable medium, and system include obtaining a document and an information element. The aspects further include identifying, from the document, an anchor element that has an anchor type and a relationship type, wherein the anchor type describes a structure of a set of anchor elements, and the relationship type describes a relationship between the anchor element and the information element. The aspects further include extracting information corresponding to the information element based on the anchor element, the anchor type, and the relationship type, and displaying the extracted information to a user.

A method, apparatus, non-transitory computer readable medium, and system for data extraction are described. One or more aspects of the method, apparatus, non-transitory computer readable medium, and system include identifying a plurality of documents and one or more information elements in at least one of the plurality of documents; generating a set of anchor elements associated with each of the one or more identified information elements using a machine learning model trained to identify flexible anchor elements that include an anchor type indicating a relationship between the anchor elements and information elements; and generating data from the plurality of documents based on the set of anchor elements, wherein the data includes attributes corresponding to the one or more information elements.

A method, apparatus, non-transitory computer readable medium, and system for data extraction are described. One or more aspects of the method, apparatus, non-transitory computer readable medium, and system include identifying a plurality of documents for data extraction to a machine learning model trained to identify information elements and anchor elements, and identifying one or more information elements in at least one of the plurality of documents. The aspects further include automatically identifying a set of anchor elements associated with each of the one or more identified information elements using the trained machine learning model, wherein each of the anchor elements in the set are associated with an anchor type that describes a structure of the set of anchor elements. The aspects further include generating data from the plurality of documents based on the set of anchor elements, wherein the data includes attributes corresponding to the one or more information elements.

An apparatus and system for data extraction are described. One or more aspects of the apparatus and system include a memory component, and one or more processing devices coupled to the memory component, the processing devices to perform operations of identifying, using an anchor component, an anchor element in a document, wherein the anchor element has an anchor type and a relationship type, wherein the anchor type describes a structure of a set of anchor elements, and wherein the relationship type describes a relationship between the anchor element and an information element; extracting, using an extraction component, information corresponding to the information element based on the anchor element, the anchor type, and the relationship type; and displaying, via a user interface, the extracted information to a user.

BRIEF DESCRIPTION OF THE DRAWINGS

FIG. 9 shows an illustrative depiction of a method of training an anchor identifier model, according to aspects of the present disclosure.

DETAILED DESCRIPTION

The present disclosure relates to the extraction of relevant and accurate information from semi-structured or unstructured documents, such as Portable Document Format (PDF) documents.

The data contained in documents is not all arranged or referenced in the same way. Different keywords are used in different documents that otherwise perform the same function, for example, the terms "Price" and "Amount" can be used interchangeably in invoices, where a computer system looking up one term may not identify the other.

Flexible anchor elements (also referred to as flexible anchors, anchor elements, and anchors) can be implemented in place of landmarks to provide greater contextual understanding of documents, rather than a single relationship based on proximity using a rigid distance calculation. Anchor elements can utilize multiple relationships and metrics to identify data of interest, where a change in one or more keywords or positions in a document would not result in failure to identify the data of interest. The anchors can have different relationships with the data of interest, where the anchors may be physically close by, semantically similar, and/or stylistically and structurally appropriate. Use of multiple relationships and metrics can make the model more robust, consistent, and accurate. Multiple anchors can be linked to a single datatype of interest (i.e., information element), where not all anchors may be present in the same document. In this manner, changes over time or between documents can still be recognized by the model.

Embodiments of the present invention provide an improved data extraction system that can extract information more efficiently and accurately by using flexible anchors. Some embodiments provide a user interface that enables an interactive, visual experience for users to identify and extract relevant information (e.g., tables, text) from a single unstructured or semi-structured document, and across multiple documents that may be unstructured or semi-structured, automatically. Flexible anchor elements determined by the system or by the user are used to identify information elements and associated data even when the document format changes and the anchor elements are inconsistent across the documents or change over time. Embodiments of the disclosure are implemented within a document reader or document editor to provide an improved document interaction interface.

Network Architecture

Figure 1:
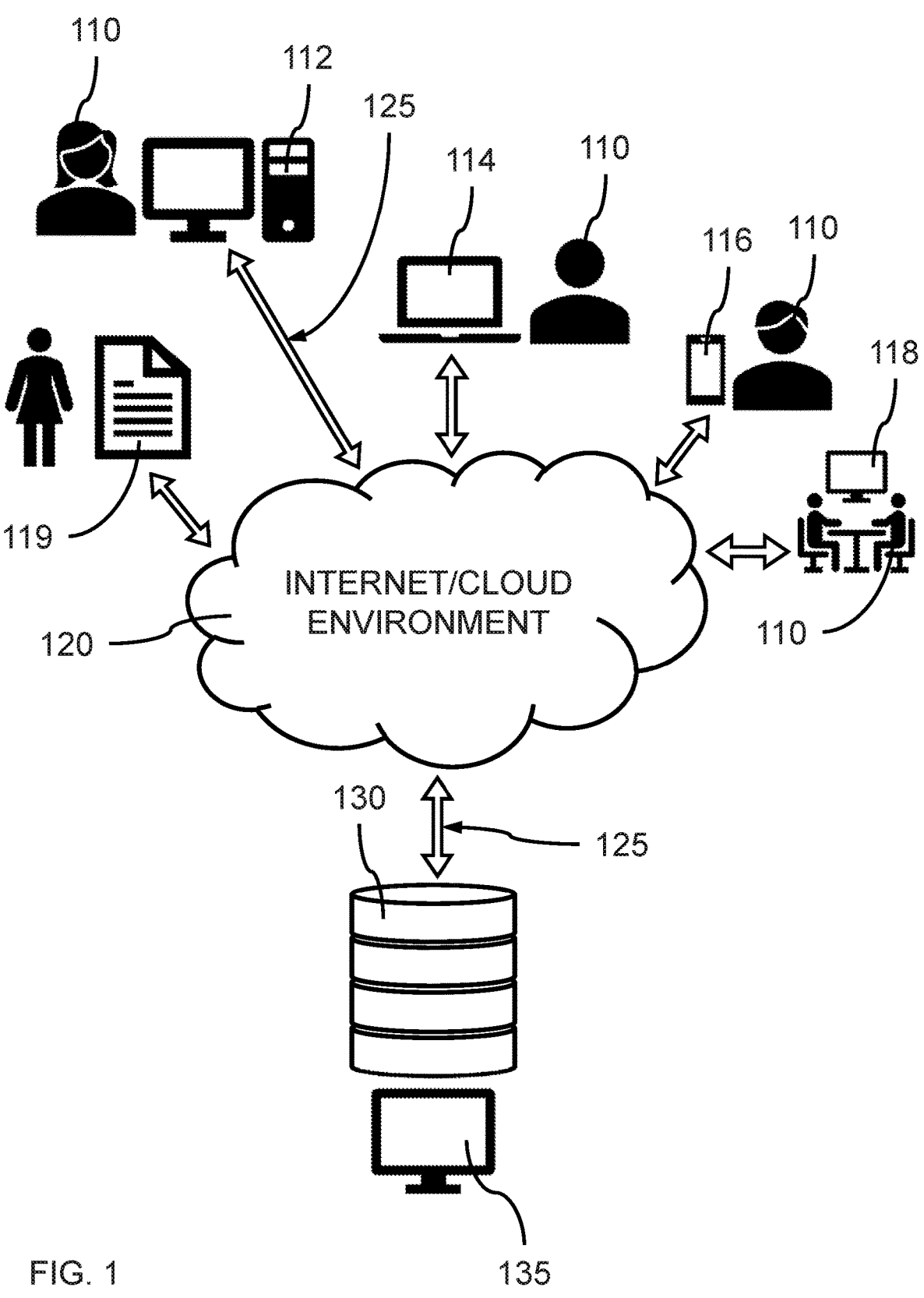
FIG. 1 is an illustrative depiction of a high-level diagram of users interacting with a remote data extraction system through their devices, according to aspects of the present disclosure.
Figure 2:
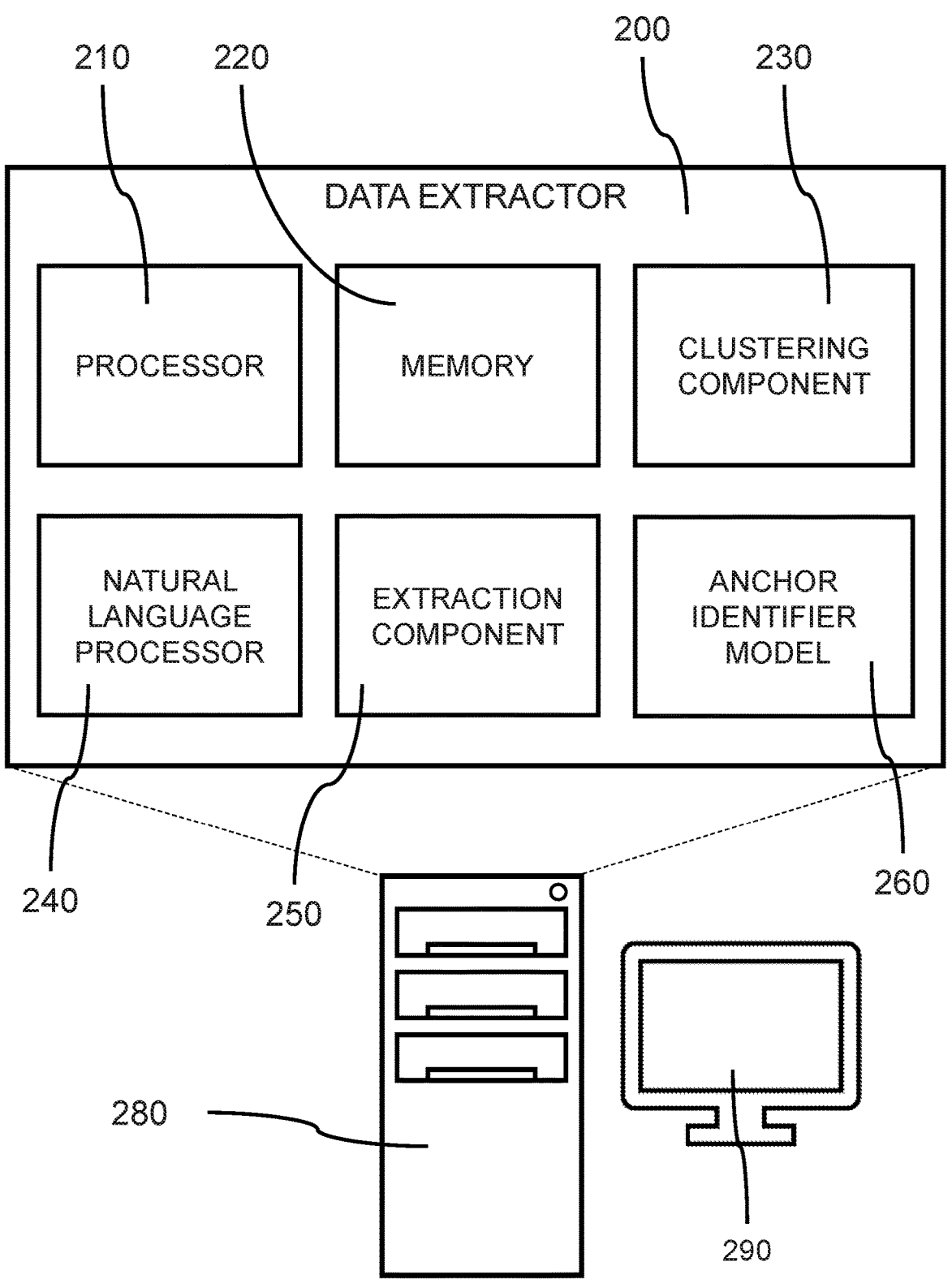
FIG. 2 shows a block diagram of an example of a data extractor according to aspects of the present disclosure.

In FIGS. 1-2, an apparatus and method for data extraction are described. One or more aspects of the apparatus and method include a memory component; and one or more processing devices coupled to the memory component, the processing devices to perform operations comprising: identifying, using an anchor component, an anchor element in a document, wherein the anchor element has an anchor type and a relationship type, wherein the anchor type describes a structure of a set of anchor elements, and wherein the relationship type describes a relationship between the anchor element and an information element; extracting, using an extraction component, information corresponding to the information element based on the anchor element, the anchor type, and the relationship type; and displaying, via a user interface, the extracted information to a user. FIG. 1 is an illustrative depiction of a high-level diagram of users interacting with a remote data extraction system through their devices, according to aspects of the present disclosure.

In one or more embodiments, a user 110 can interact with a remote data extraction system 130 through the cloud/internet 120 by electronic communication 125. A user 110 may interact with the data extraction system 130 using, for example, a desktop computer 112, a laptop computer 114, a handheld mobile device 116, for example, a smart phone or tablet, a smart tv 118, or document processing system 119, including a scanner, fax machine, and/or document/image processing software. In various embodiments, the data extraction system 130 can include, for example, a deep neural network, including, but not limited to convolutional neural networks (CNN), transformer networks, encoder neural networks, natural language processors (NLP), and combinations thereof, although other deep neural networks are also contemplated.

In various embodiments, the user 110 can communicate 125 with the data extraction system 130 to submit documents for analysis and data processing, and receive results from the data extraction system 130, for example, identification of entities, dates, and calculations on data contained within the documents.

In various embodiments, the cloud 120 is a computer network configured to provide on-demand availability of computer system resources, such as data storage and computing power. In some examples, the cloud 120 provides resources without active management by user 110. The internet/cloud environment 120 can include data centers available to multiple users over the Internet, where the internet can be a global computer network providing a variety of information and communication facilities. Some large cloud networks have functions distributed over multiple locations from central servers. A server is designated an edge server if the server has a direct or close connection to a user 110. In some cases, cloud environment 120 may be limited to a single organization. In other examples, the cloud 120 is available to many organizations, where communication may be through the internet. In an example, the cloud/internet 120 includes a multi-layer communications network comprising multiple edge routers and core routers. In another example, cloud 120 is based on a local collection of switches in a single physical location. According to some aspects, the internet/cloud environment 120 provides electronic communications between user device(s) 112, 114, 116, 118, and the data extraction system 130.

In various embodiments, the user devices 112, 114, 116, 118, 119, can include software that can communicate and interact with the data extraction system(s) 130, including, but not limited to, submitting a document or a digital image of a document for processing. Output from the data extraction system(s) 130 can be communicated to the user devices 112, 114, 116, 118, 119, and/or displayed on a system display screen 135.

FIG. 2 shows a block diagram of an example of a data extractor according to aspects of the present disclosure.

In various embodiments, the data extractor 200 can include a computer system 280 including one or more processors 210, computer memory 220, a clustering component 230, a natural language processor 240, an extraction component 250, and an anchor identifier model 260. The computer system 280 of the data extractor 200 can be operatively coupled to a display device 290 (e.g., computer screen) for presenting prompts and images to a user 110, and operatively coupled to input devices to receive input from the user, including the original image(s).

According to some aspects, clustering component 230 can perform analysis on a plurality of documents using a computational model (e.g., a support vector machine (SVM)) that determines similarities between the documents, and groups them according to the detected similarities. Clustering may also utilize nearest neighbor analysis.

In various embodiments, the natural language processor (NLP) 240 can provide natural language analysis of the documents, and provide querying functions to the user. The natural language processor 240 can recognize words in the documents, and calculate semantic similarity between words (or tokens) in the documents for an anchor metric. A query can be received from a user requesting particular data from the documents. The system can analyze the query using a natural language processor to identify the type of data to be extracted from the documents, and generate a response to the query based on the data.

In various embodiments, the extraction component 250 can identify and extract the data associated with an information element, for example, where a table of items can be an information element in a purchase order, the actual list of items and prices would be the data associated with the information element (i.e., the table). The extracted data can be provided to a user for analytics and calculations.

In various embodiments, the anchor identifier model 260 can be configured to identify anchor candidates in a document using metrics, and hierarchically sort the identified anchor candidates for each information element to propose a highest valued candidate anchor to a user. The anchor identifier model 260 can be a trained neural network that can learn from user selections of anchors.

Data Extraction

In FIGS. 3-8, a method, apparatus, and non-transitory computer readable medium for image processing are described. One or more aspects of the method, apparatus, and non-transitory computer readable medium include identifying a document and an information element; identifying, from the document, an anchor element that has an anchor type and a relationship type, wherein the anchor type describes a structure of a set of anchor elements, and the relationship type describes a relationship between the anchor element and the information element; extracting information corresponding to the information element based on the anchor element, the anchor type, and the relationship type; and displaying the extracted information to a user.

Some examples of the method, apparatus, and non-transitory computer readable medium further include identifying a plurality of anchor candidates for locating the information element, wherein the anchor element is selected from the plurality of anchor candidates.

Some examples of the method, apparatus, and non-transitory computer readable medium further include displaying the plurality of anchor candidates to the user; and receiving an anchor selection input from the user, wherein the anchor element is selected based on the anchor selection input.

In some embodiments, the anchor type comprises a single anchor type, a multiple anchor type, a hierarchical anchor type, a self-anchor type, or a combination anchor type. In some embodiments, the relationship type comprises a position type, a structure type, a style type, or a semantic similarity type.

Some examples of the method, apparatus, and non-transitory computer readable medium further include locating the information element in the document based on the anchor element, the anchor type, and the relationship type, wherein the information is extracted from the information element.

Some examples of the method, apparatus, and non-transitory computer readable medium further include determining that the relationship type comprises a position type; and identifying a position relationship between the information element and the anchor element, wherein the information element is located based on the position relationship.

Some examples of the method, apparatus, and non-transitory computer readable medium further include determining that the relationship type comprises a structure type; and identifying a structural relationship between the information element and the anchor element, wherein the information element is located based on the structural relationship.

Some examples of the method, apparatus, and non-transitory computer readable medium further include determining that the relationship type comprises a style type; and identifying a style relationship between the information element and the anchor element, wherein the information element is located based on the style relationship.

Some examples of the method, apparatus, and non-transitory computer readable medium further include determining that the relationship type comprises a semantic type; and identifying a semantic relationship between the information element and the anchor element, wherein the information element is located based on the semantic relationship.

Some examples of the method, apparatus, and non-transitory computer readable medium further include determining that the anchor type comprises a multiple anchor type; and identifying an additional anchor element, wherein the set of anchor elements includes the anchor element and the additional anchor element, and the information is extracted based on the anchor element and the additional anchor element.

Some examples of the method, apparatus, and non-transitory computer readable medium further include determining that the anchor type comprises a hierarchical anchor type; and identifying an additional anchor element having a hierarchical relationship to the anchor element, wherein the set of anchor elements includes the anchor element and the additional anchor element, and the information is extracted based on the anchor element and the additional anchor element.

Some examples of the method, apparatus, and non-transitory computer readable medium further include determining that the anchor type comprises a self-anchor type, wherein the information is extracted from the anchor element.

Figure 3:
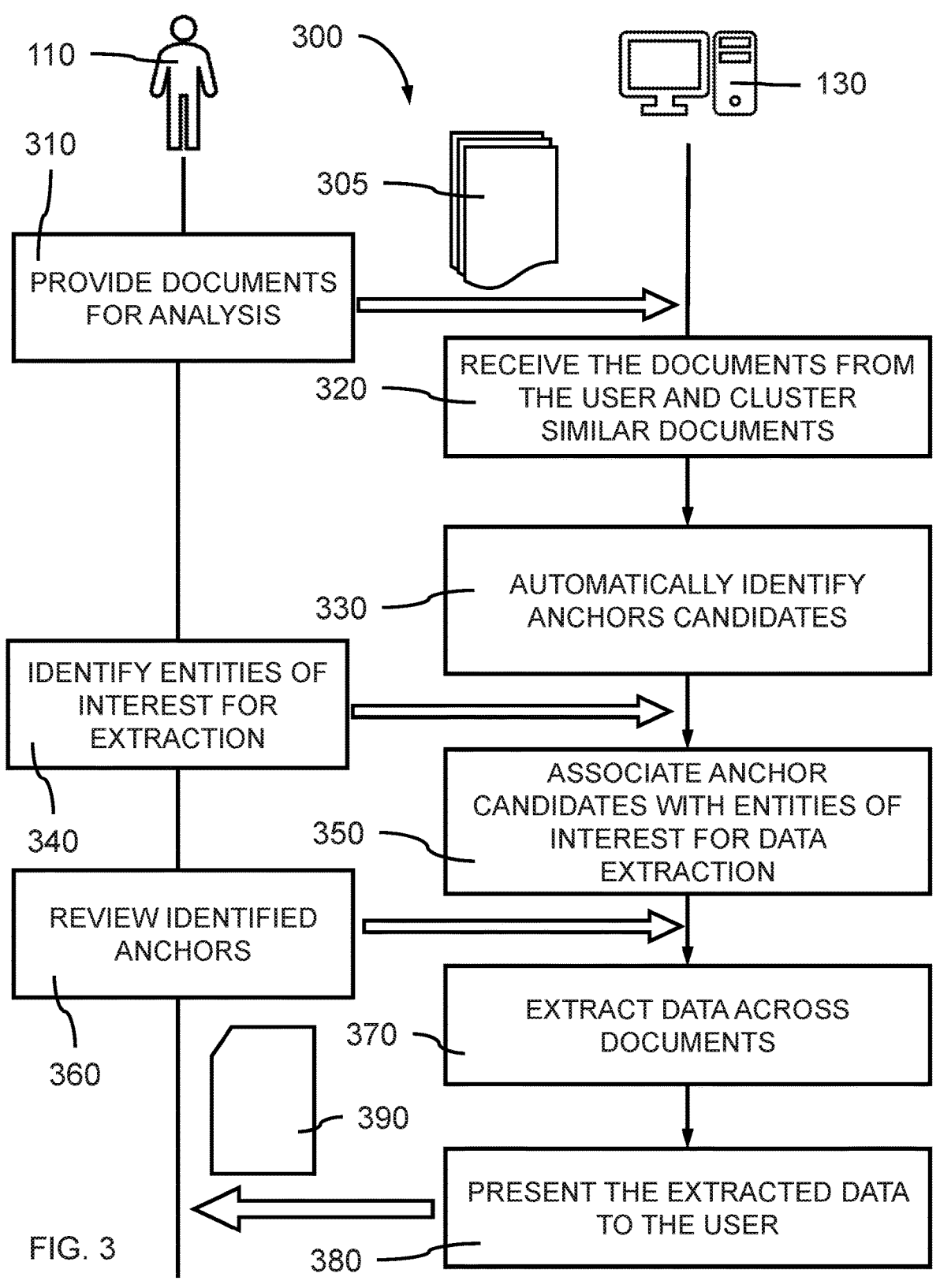
FIG. 3 shows a flow diagram for a method of performing anchor identification and data extraction for information elements, according to aspects of the present disclosure.

FIG. 3 shows a flow diagram for a method of performing anchor identification and data extraction for information elements, according to aspects of the present disclosure.

In various embodiments, a data extraction process 300 is provided, where flexible anchor elements can be identified for information elements, and data associated with the information elements can be extracted from a plurality of documents 305.

In various embodiments, at operation 310 a user 110 can provide a plurality of documents 305 to the data extraction system(s) 130 for analysis and data extraction. The documents 305 submitted to the data extraction system(s) 130 can be unstructured or semi-structured documents, (e.g., PDF's).

At operation 320, the data extraction system(s) 130 can receive the plurality of documents 305, and analyze the documents for similarities. The documents 305 can be clustered based on the detected similarities, where a similarity can be the format of a subset of documents, for example, a plurality of invoices having the same arrangement of buyer fields and item entries in comparison to healthcare documents listing patients and treatments/services.

At operation 330, the data extraction system(s) 130 can automatically identify one or more anchor candidates, where the anchor candidates can be identified for documents 305 in a cluster based on a plurality of metrics. The data extraction system 130 can calculate values for each of the metrics, and normalize the calculated values, and hierarchically arrange a list of anchor candidates.

At operation 340, the user 110 can identify one or more information elements in at least one document, where the user 110 can select the information element from the text and data fields in the document using a graphical user interface (GUI).

At operation 350, the data extraction system(s) 130 can automatically associate one or more anchor candidates with one or more target information elements for data extraction from the plurality of documents 305.

In various embodiments, the anchor candidates can be automatically identified when multiple documents are uploaded for extraction and processing. Whenever a user selects one or more target information elements, appropriate anchor(s) are assigned from the identified candidate anchors (e.g., based on proximity, structural and stylistic similarity, etc.) and presented to the user 110 for confirmation.

At operation 360, the user 110 can review each of the identified anchor candidates for suitability in identifying the associated information element. The user 110 may accept or reject the data extraction system generated anchor candidate(s) for a particular information element.

At operation 370, the data for the identified information elements can be extracted across the documents and stored for analysis and calculations. Once the user 110 confirms (or revises) the anchor(s) in one document, the data for the identified information elements can be extracted from the document used to identify the information element of interest and other documents as well.

At operation 380, the extracted data 390 can be presented to the user. The extracted data 390 can be formatted in a manner determined by the user 110, for example, as a document on the user's device and/or a display of the data extraction system 130, as a printed hard copy output, as a data file, etc. The extracted data 390 can be in the form of text, tables, figures, etc.

Figure 4:
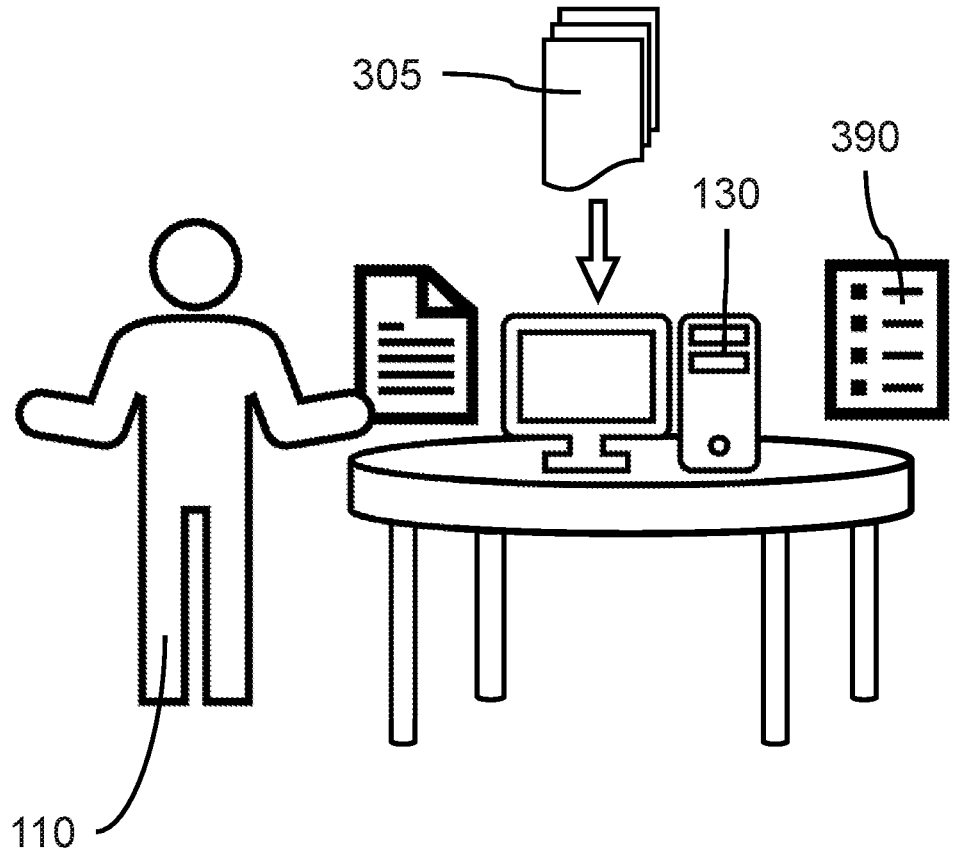
FIG. 4 is an illustrative depiction of a diagram of an anchor identifier system to perform anchor identification and information element association, according to aspects of the present disclosure.

FIG. 4 is an illustrative depiction of a diagram of an anchor identifier system to perform anchor identification and information element association, according to aspects of the present disclosure.

In various embodiments, a user 110 can provide a plurality of heterogeneous, unstructured and/or semi-structured documents 305 to the data extraction system 130 to obtain extracted data 390 from the plurality of documents 305. The data extraction system 130 can include tools for providing the extracted data 390 to the user 110 for analyzing and calculating values from the extracted data.

Various kind of documents can each have their own formats, such that a collection of documents is heterogeneous, even documents utilized for the same purpose, can be heterogeneous. Each user or client can impose his/her own formatting and style to each class of document, for example, purchase orders, shipping orders, invoices, notifications, emails, etc. The lack of a formal, consistent structure in these semi-structured and unstructured documents can make identifying and extracting data difficult. In addition, these formats can change over time, such that substantive changes may be made between generations of documents and formats.

Specific anchors may not occur in all documents or in the neighborhood of particular predetermined fields of the documents. For example, a document of a hotel reservation confirmation may specify a "Check-In Date:" and Check-Out Date:", or "Check-In" and "Check Out", or "Arrival" and "Departure", or "Reservation: Tuesday, May 5th to Friday, May 8th", or lack a Heading or Title. There can be different formats and wording. The placement of such anchors on the document may also vary, where the examples for the hotel reservation may appear at the top or bottom of the document with varying information in between, and may be above or laterally adjacent to the information element specifying an information element.

To address variation between documents, flexible anchor elements can be implemented, where the flexible anchor elements can identify common, repeating entities across multiple documents to help locate information elements (e.g., data values). Each information element (e.g., data value) can be associated with a plurality of flexible anchor elements based on the anchor's and information element's relationship in terms of one of certain metrics (e.g., "position", "style", "structure", and "semantics").

In various embodiments, the system can provide for human-assisted bulk extraction of desired information from multiple documents, where the user can optionally override the system's automatic determination of anchor elements and relationships. In cases where the tool fails to automatically determine appropriate anchor elements, users can override them by interactively annotating within the document. The tool may also infer the user's "anchoring" strategy and use such anchoring strategy for the data extraction. An extraction program can be based on the relationship between a desired information element and its corresponding anchor(s), and provide interactive data extraction from a batch of documents.

In various embodiments, a user can select desired information elements from a document, and the system can automatically identify and associate relevant anchor candidates to the target information elements. The system can automatically associate the most appropriate anchor with each of the user selected information elements. For example, for a desired information element, invoice dates, e.g., "Jan. 1, 2021", a suitable anchor could be the label, "Invoice Date:".

In various embodiments, the analysis of the documents can be image based, where the physical location and typesetting of the document can be examined, and/or language based, where the words and their contextual meaning can be analyzed. Language based analysis can be accomplished using a natural language processing (NLP) model, for example, Bidirectional Encoder Representations from Transformers (BERT).

In various embodiments, the system can determine a pixel distance between the information element and each anchor candidate, where the document is represented as a digital image. Greater weight can be given to identified anchors that are closer to the specified information element, as closer anchors are considered more likely to be semantically relevant to the information element, and may be more consistently expected to be located in the same position relative to the information element. For example, consider that a signature line may appear at the very bottom of each purchase order, but would be less relevant to a label, "Invoice No." and the associated number information element at the top of the same forms.

In various embodiments, the system can determine an angle in degrees between an information element and each identified anchor candidate, where measured angle may be, for example, 0, 90, 180, and 270 degrees, because anchors are more likely to be above, below, to the left or to the right of an information element, although the relative positioning may also be along a diagonal with an arbitrary angle.

In various embodiments, the system can determine a difference between fonts of an anchor candidate and an information element, where anchor candidates with a different font or bolder text are more likely to be a relevant title or heading. The different formatting may be determined through optical character recognition (OCR) from the image of the document, or from metadata, such as HyperText Markup Language (HTML) style properties set for attributes.

In various embodiments, the system can determine between the HTML-like structural identity of the information element and each anchor candidate. In various embodiments, the system can determine semantic similarity between the information element and each anchor candidate, where a higher similarity score can signify semantically more relevant anchors.

In various embodiments, the semantic similarity (similarity in meaning) may be computed between all N elements extracted from the document. This can indicate "how similar" (and hence compatible) an element is relative to other elements. In various embodiments, a text encoder, for example, BERT, WordNET, etc., may be used to calculate the semantic similarity.

In various embodiments, the system looks for repeating n-grams across all documents that can then reliably locate, and thereby extract, the dynamically updating entities in proximity to the anchors. In various embodiments, once computed, the system can quantify and normalize the above feature metrics to a [0-1] scale.

In various embodiments, the pixel distance, which may be a distance vector, can be normalized by dividing each of the pixel distances by the shortest distance, and taking the inverse, where the closest anchors to the information element have a normalized score=1, and furthest anchors to the information element have a normalized score=0.

In one or more embodiments, an interactive tool can allow users to (1) extract relevant information (e.g., tables, text) from one or more PDF documents, and (2) perform analytics in situ, within the same user interface and with just a few clicks. Providing these capabilities within the same tool minimizes tool switching and facilitates a seamless flow and fluid user experience.

In one or more embodiments, techniques can be used to extract tables, images, algorithms and formulae, as well as layouts and styles from PDF documents. The techniques can be Machine Learning (ML) based techniques that can utilize neural networks, probabilistic models, and Markov logic networks.

In one or more embodiments, techniques can use single "anchors" to automatically generate extraction programs that automatically extract the desired value(s) based on the distance between the identified anchor and a target data value for a desired information element recognized as associated with the anchor. When the automated extraction does not consistently identify a desired information element, a user can identify alternative anchors for the information element.

In one or more embodiments, humans can interactively override one or more system-determined "anchors" and the system can use the new, user-defined anchors to re-learn a correct relationship between the new anchors and the desired information element, and then re-execute the extraction process. In various embodiments, each desired information element can be assigned one or more anchors having an anchor type (e.g., "single", "multiple", "hierarchical", or "self", "combination") that are either based on their relationship in terms of one of certain metrics (e.g., "position", "style", "structure", and "semantics"). Anchors that change across documents can be sensitive to the particular feature metric, where such sensitivity can be reduced by increasing the weight(s) of the other feature metric(s).

In various embodiments, a technique is utilized that synthesizes an extraction program based on the relationship between a desired information element and its corresponding anchor(s) in terms of metrics such as distance, style, structure, and semantics. This relationship is automatically determined by the system, but the user can optionally override it (by rejecting the system's recommendation and then manually annotating the document), allowing the system to infer the human's strategy and re-learn from it.

In various embodiments, based on a user's overriding interactions, the system can process the updated relationship between the information element and the new anchor(s), and learn new weights by re-ranking anchors from among relationship types [e.g., "position", "style", "structure", and "semantics"] and anchor types [e.g., "single", "multiple", "hierarchical", and "self"]. For example, if the system-defined anchor was "single" and "position"-based and if the user overrides the system-defined anchor to some other anchor that is structurally dissimilar to the information element in the same way across documents, then the new relationship will be "single" and "structure"-based.

In one or more embodiments, an ML model trained in real time can extract user-specified information elements from across multiple documents. In various embodiments, the ML model can be a deep neural network, a convolutional neural network (CNN), or a transformer-based model. In various embodiments, a hard-coded software model may be used to identify flexible anchor elements.

To extract entities from across multiple documents, the system can trace the same information element relationship that was learned from an initial document, but in reverse. For example, consider where a user interacts with one of many documents and selects "John Doe" as an information element, "Client Name:" as the corresponding (single) anchor, and the relationship based on "structure" and "proximity" (e.g., the anchor is an HTML <H1> tag and the information element is the closest HTML <P> tag). Next, to locate and extract the same information element from other documents, the model will first locate the anchor by string match (i.e., "Client Name:") and also structure match (i.e., <H1>); then, the model can scan for nearby elements with the <P> tag and select the one that is closest (by computing inter-element distance). This selected element is the information element across other document(s).

BERT is an example of a language model that can be used to encode words from a document, BERT trained on a large document corpus to determine semantic similarity (from 0 to 1) between two n-grams: the desired information element and the anchor candidates. In various embodiments, the value of n for the n-grams can be in a range of 1 to 3, to capture single word entities (e.g., "Buyer", "Seller", "Item", etc.), bi-word entities (e.g., "Purchase Date", "Invoice Date", etc.), tri-word entities (e.g., "Check In Date:", "Date of Issue", etc.).

After the user specifies the desired information elements, the system can automatically extract the data and provide the extracted data to the user in a predetermined format. In various embodiments, support for multiple tabular datasets (instead of one single tabular dataset) curated from the data extracted within a single document as well as across multiple documents is provided. In various embodiments, the system enables interactive data extraction from a batch of documents.

While analyzing a document of interest for fields that are consistent across multiple, similar documents can reveal textual "landmarks, a single, nearest landmark is not always effective for locating information to be extracted. Documents frequently evolve over time in terms of layout, styling, and content. Extracting information can also be a difficult due to the inherently unstructured nature of the documents.

According to embodiments of the present inventive concept, the flexible anchor elements can locate and identify target information elements across different types of documents and satisfy different types of user needs. At least a portion of a plurality of the anchor elements may stay consistent across multiple documents, and can reliably help find the associated information elements. The system may identify the associated information elements based on a portion of the plurality of the anchor elements. For example, "Invoice Date" is likely to be in purchase order, packing slip, and shipping order type documents, whereas the actual associated date would be different between different documents, unless all of the documents were generated on the same date. When existing sections of a document are reordered (e.g., credit and debit columns in a table are swapped), because new sections have been added (e.g., new fields), or there are stylistic makeovers to certain content (e.g., some font sizes are increased, bolded or italicized), the anchors themselves would remain consistent.

In one or more embodiments, flexible anchor element types can include:

Single: a "single" anchor type refers to an individual anchor element (e.g., "Invoice Date:") that consistently and reliably and accurately locates the information element of interest (e.g., "Jan. 12, 2014") within one as well as across multiple documents. This anchor can be nearby, semantically similar, or stylistically and structurally appropriate to the information element of interest.

Multiple: document formats can change in terms of their layout, styles, and content. For example, consider a scenario where out of 20 documents, 15 documents have layout No. 1 and the other five documents have layout No. 2, where layout No. 1 involves a different anchor element than layout No. 2. Therefore, multiple "single"-anchors can be associated with the same information element to successfully extract data from all 20 documents.

Hierarchical: where the same label can apply to more than one information element, an anchor element for the repeated label can be associated with another anchor element of higher generality. For example, consider a scenario where there are repeated labels in the same document, for example, "TAXID" referring to information for both a "Seller" as well as a "Buyer". Here, Seller can be a first label and Buyer can be a second label, where each form anchors for the information respectively associated with a Seller or a Buyer. A separate anchor, "TAXID" can be associated with each of the Seller and Buyer anchors, thereby having two hierarchical anchors, e.g., Buyer→TAXID and SELLER→TAXID, where Buyer or Seller is higher in the hierarchy than TAXID. These types of anchors can be used for (1) semantic data modelling when the user is trying to add structure to a document and curate a schema, (2) disambiguating repeated labels in the same document, and (3) determining a hierarchical reading order from a document accessibility standpoint. Data curation is a way to organize and integrate data collected from various sources, and schema defines how data is organized within a relational database.

Self: due to the nature of data extraction, sometimes certain label-value pairs are extracted as a single concatenated text, e.g., "Invoice No: 109241237" (instead of two separate texts, "Invoice No:" and "109241237") as an anchor and an information element. A user could identify such scenarios and then interactively split them by the delimiter (":") marking the first half as the "self"-anchor and the second half as the corresponding information element of interest.

Combinations of Single, Multiple, Hierarchical, and/or Self: Similar to the "multiple" anchor type, it is sometimes possible that a certain set of documents involve a different set of anchors than another set of documents. To extract data from all the documents, a combination of anchor elements of potentially different types (e.g., one multiple, two single)

may be used. The metadata relating to the selected information elements and the associated anchors for each information element can be stored outside of the document.

In various embodiments, an information element can have a plurality of associated anchor elements, where different anchors can operate in the same document, for example, the information relating to a buyer may be directly below a label, "Buyer" but also directly above a label, "Items". Both of the labels can function as anchors within the same document to identify the information element, the actual buyer; whereas, different labels "Buyer" or "Purchaser" may function as anchors across different documents using the different terms to identify the same information. It is unlikely that the same document would include both a "Buyer" label and a "Purchaser", since the two labels would be synonymous and used in the same capacity.

In various embodiments, the combinations can be stored as a dictionary of lists with each key corresponding to a separate anchor group instance whose value is a list of anchor instances. With this representation, "single", "multiple", "self" as well as "hierarchical" anchors can be efficiently modeled and stored for processing. For example, a "single" and "self" anchor group will have one key and one anchor instance; "multiple" will have multiple keys but one anchor instance each; "hierarchical" will have one key but more than one anchor instances; "combination" may have one or more keys and one or more anchor instances. During processing, these anchors can be accordingly looped through one-by-one.

In various embodiments, the anchor element types are determined based on their relationship with the information element of interest in terms of their relative similarity.

In one or more embodiments, Relationship types can include:

Position (which can include two aspects):

1) Distance: The distance vector for physical distance from an information element to the associated anchor element includes both magnitude and direction. For example, the system can utilize an anchor that is physically closer (e.g., least distance) to the information element of interest, and also positioned in an appropriate direction (e.g., anchor is approximately to the left, right, top, or bottom of the information element), for example, on the same line or directly above as a heading. Relative positioning of the desired information (e.g., information element) to an anchor element on a page of a document can be used to recognize the information through the positional relationship with the anchor, where an information element may be expected to be close to an anchor the information element shares a relationship with. For example, the label, "Buyer" would be expected to be closest to the actual name of the buyer, rather than the name of a seller, an invoice number, or to items being bought.

Various keywords, for example, "Date", "Description", "Quantity", "Price", Total, etc., that can provide a description of the associated information, can appear in similar documents and act as anchor elements. The actual words/anchors, however, may not show up in the same location in different documents, and even the words may vary, for example, "quantity" may be used but "amount" may be used in other documents, or at different locations in the same document.

2) Reading Order: There is a particular order in which a human reads a document, called the reading order. The system can determine this reading order and would consider an anchor element that is along the reading order, either before or after the information element of interest, rather than an anchor element outside the reading order, for example, a label coming after or to the right of an information element. This relationship may conflict with a distance relationship, as closer elements may not necessarily be along the natural reading order.

Structure: The system captures the HTML-like element tags associated with the information element and the anchor element candidates, and can give greater weight to an anchor element that is either structurally superior as per the DOM-hierarchy (e.g., anchor is the heading <H1> tag and the information element is the <span> or <p> tag) or inferior, where structurally unequal entities can be good value-anchor candidates.

Style: Similar to "Structure", the system can identify the CSS-like styles associated with the information element and the anchor element candidates and prefer an anchor element that is either stylistically superior (e.g., anchor's Font Weight and/or Font Size are greater than then information element) or inferior, where stylistically unequal entities can be good value-anchor candidates.

Semantic similarity: The system can give greater weight to an anchor element candidate that is more semantically similar to the information element. Consider a scenario wherein the system prioritizes two anchor element candidates for the information element "Jan. 2, 2021": "Date" and "Invoice No:". Because Jan. 2, 2021 is more semantically similar to "Date" (e.g., based on datatype compatibility), the system would choose "Date" over "Invoice No:" as the associated anchor.

In various embodiments, a BERT language model trained on a large document corpus, for example, can be used to determine semantic similarity (from 0 to 1) between two n-grams: the desired information element and each anchor candidate. This may not only help with extraction but also semantic data modelling, where meaningful schemas can be automatically generated across documents. The system can look for repeating n-grams across all documents that can then help reliably locate (and hence, extract) other dynamically updating entities around them.

Figure 5:
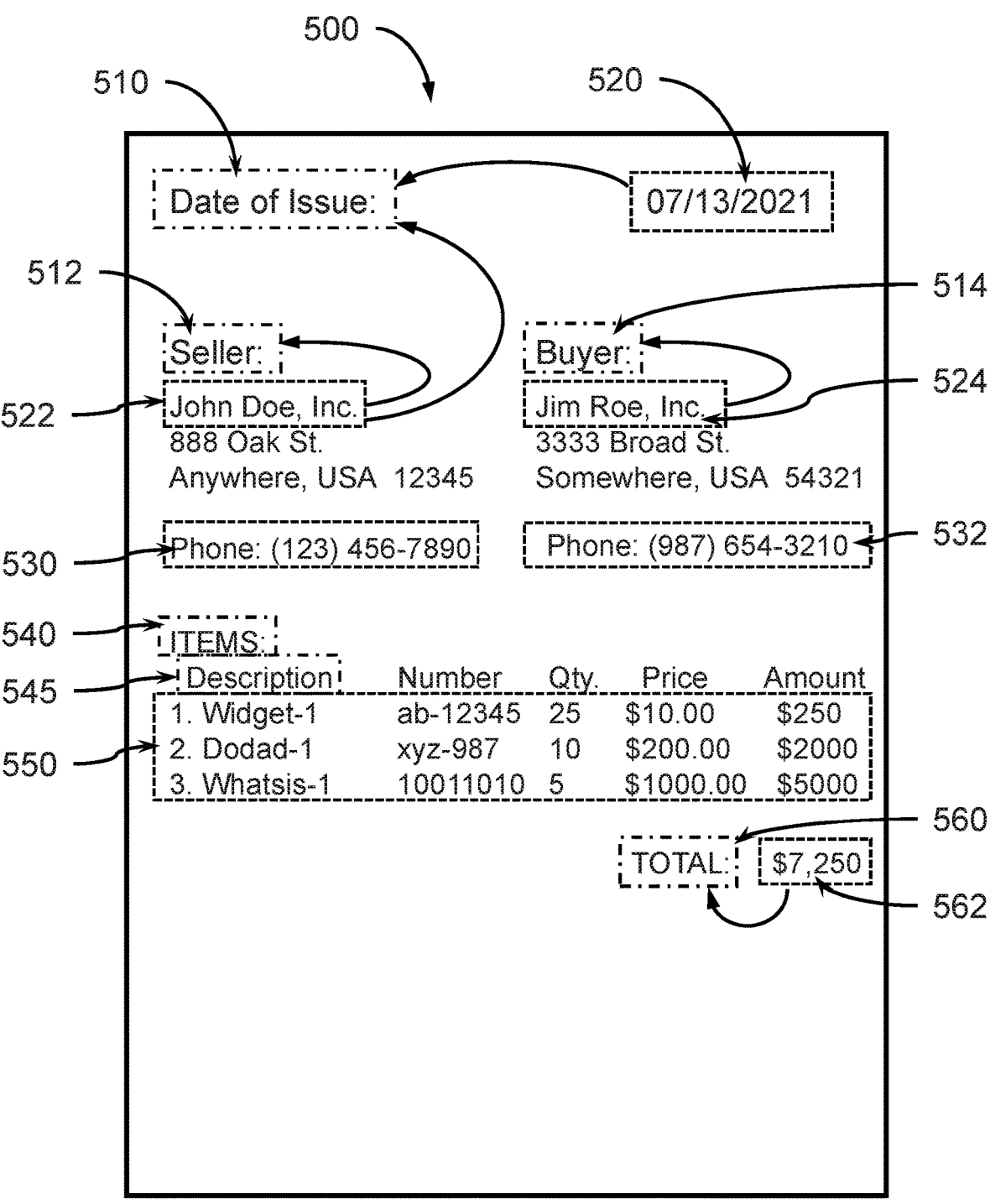
FIG. 5 shows an illustrative depiction of a document analysis for anchor identification and information element association, according to aspects of the present disclosure.

FIG. 5 shows an illustrative depiction of a document analysis for anchor identification and information element association, according to aspects of the present disclosure.

In various embodiments, a document 500 can include one or more flexible anchor elements 510, 512, 514, 540, where the flexible anchor elements can be titles and/or headings in the document, that identify associated information. The associated information can be identified as information elements 520, 522, 524, 550, where the information element can be a label attached to a data field representing the data of interest. That is, an information element can be a generic identifier for an actual value without being limited to the actual value. For example, the date field associated with the anchor element, "Date of Issue" can be an identified information element, that contains a value of, "Jul. 13, 2021". Information elements would relate to the data field having a date formatted piece of data, and not the specific value of "Jul. 13, 2021" in the document, since the specific value may vary across documents. Searching a plurality of documents for an information element of interest would identify each of the dates in the document field having "date" formatting, and not just the specific value in the document used to identify the information element.

In various embodiments, the information element 520 ("Jul. 13, 2021") can be associated with the anchor element 510 ("Date of Issue") based on a plurality of metrics calculated for the relationship between the information element 520 and the anchor element 510. The relationship can take into account the relative positioning of the information element 520 to the anchor element 510, where the information element 520 is located on the same horizontal line as the anchor element 510, and within a measurable distance (number of pixels). Other anchor elements may be physically closer to the information element 520 ("Jul. 13, 2021"), for example, flexible anchor element 514 ("Buyer"), but other metrics, for example, semantic similarity, can increase the probability of anchor 510 ("Date of Issue") being the proper anchor selected for the information element 520 ("Jul. 13, 2021").

In various embodiments, the flexible anchor element 510 ("Date of Issue") can be identified as a "single" type anchor for the information element 520 ("Jul. 13, 2021"), where the anchor element 510 is the only anchor associated with information element 520. The information element 522 ("John Doe, Inc.") can be associated with anchor elements ("Seller") 512 and ("Date of Issue") 510, where the anchors 510 ("Date of Issue") and ("Seller") 512 can be identified as a "multiple" type anchors for the information element 522 ("John Doe, Inc.").

As a non-limiting example, Anchor 1 ("Seller") and Anchor 2 ("Date of Issue") can be multiple anchors for the "John Doe" information element 522. Anchor 1 is semantically similar; whereas Anchor 2, even though it is not semantically similar, might be more effective from a proximity standpoint. Together, this multiple anchor combination can more effectively locate and extract target information elements. In some documents, "Date of Issue" may work better, while in other documents "Seller" may be more effective; together, the anchors would have higher coverage and accuracy.

In various embodiments, the information element 530 ("Phone: (123) 456-7890") can also be an anchor element identified as a "self" type anchor, due to the pairing of "Phone:" and "(123) 456-7890", where it may appear as a single field. The user can split the information element 530 into an associated anchor element, "Phone", and a value, "(123) 456-7890" for the information element 530, where the anchor element, "Phone", can be consistent, while the value changes.

In various embodiments, the flexible anchor element 540 ("Items:") can be associated with a table of data identified collectively as an information element 550. In various embodiments, the two flexible anchor elements "Phone:" may each be hierarchically associated with the anchor element 512 ("Seller") or anchor element 514 ("Buyer"), respectively. Similarly, anchor 512 ("Seller") and anchor 514 ("Buyer") can be hierarchically associated with the anchor 510 ("Date of Issue"). In various embodiments, an information element 562 ("$7,250") can be associated with the flexible anchor element 560 ("Total"), where anchor element 560 is a single type anchor.

Figure 6:
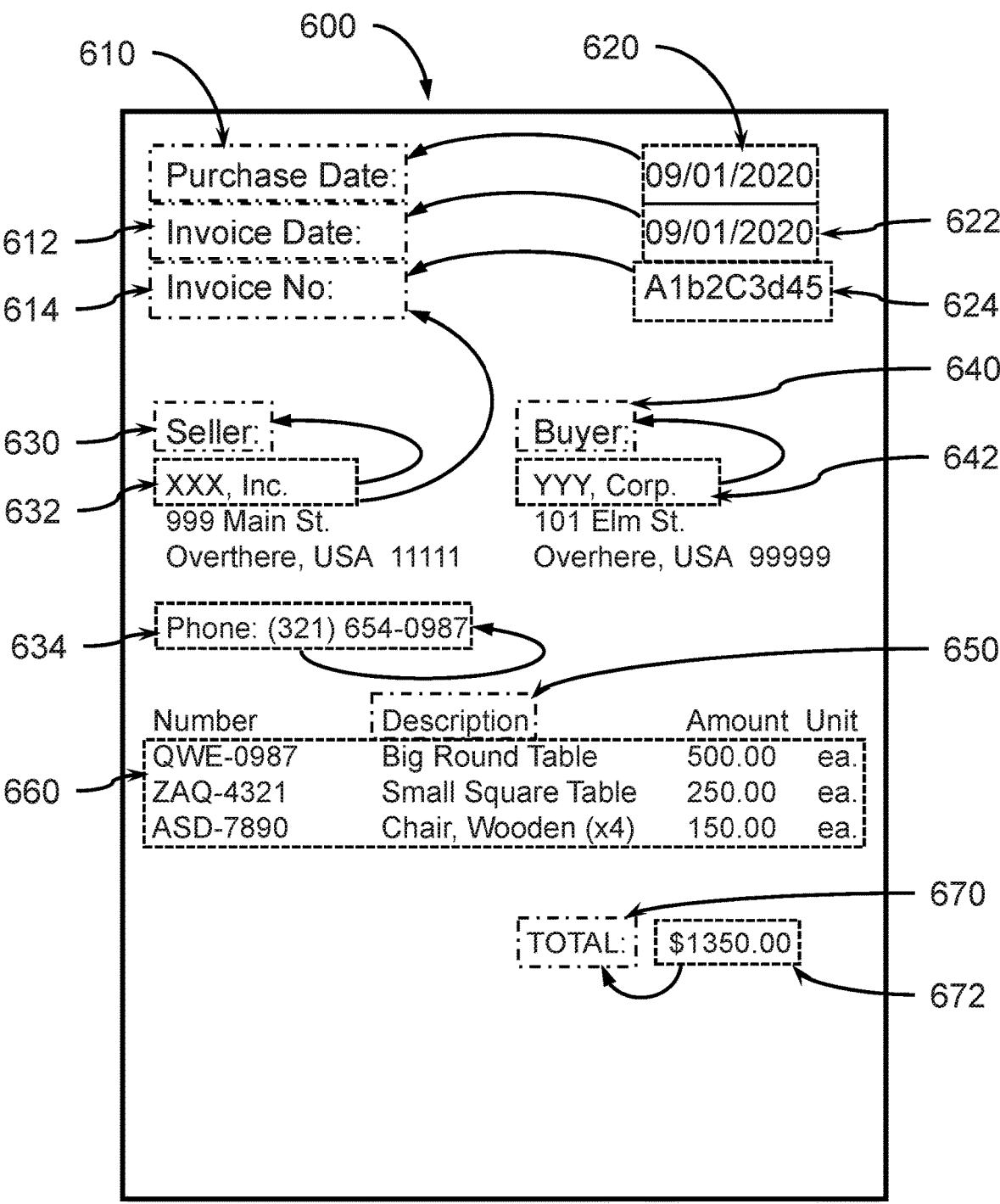
FIG. 6 shows an illustrative depiction of a document analysis for anchor identification and information element association, according to aspects of the present disclosure.

FIG. 6 shows an illustrative depiction of a document analysis for anchor identification and information element association, according to aspects of the present disclosure.

In various embodiments, a document 600 having a different format than document 500 can contain similar information, but may have different fields and values as well. Changes in terminology may hide similar information between documents. For example, is "Purchase Date:" or "Invoice Date:" the same as "Date of Issue:", or are they all different? Document 600 does contain information similar to document 500, indicating a Seller, a Buyer, Addresses, and a list of items, but document 600 lacks a heading, "Items:", and includes a "Purchase Date:" and an "Invoice No:". In addition, document 600 has two dates in close proximity to each other. This illustrates the difference in formatting, contents, and other details that can cause difficulty for a model to consistently identify fields and data for extraction.

In various embodiments, the data extraction system 130 can attempt to use a learned strategy in reverse to locate and extract the target information elements. However, due to format changes, it may not be successful. The data extraction system 130 can assign "confidence scores" representing the uncertainty, where the list of format changes can be extensive. However, the user can still override the system-recommended anchor elements by interacting with the system and resolving such issues.

In various embodiments, the data extraction system 130 can identify flexible anchor candidates 610, 612, 614 for the information element including data fields 620, 622, 624 and containing the date-formatted values 620, 622 and alphanumeric string 624.

In various embodiments, a user can indicate that the flexible anchor element 510 "Date of Issue:" in document 500 relates to the same information as flexible anchor element 612 "Invoice Date:" in document 600. Therefore, the information element 622 in document 600 can be equated with the information element 520 in document 500, and both anchor element 510 and anchor element 612 can be associated, as a "multiple" type anchor, with both information element 520 and information element 622 across the documents 500, 600.

In various embodiments, flexible anchor element 630 "Seller" and flexible anchor element 640 "Buyer" are consistent with anchor element 512 "Seller" and anchor element 514 "Buyer" in both documents. The multiple anchors ("Seller") 512 and ("Buyer") 514 can be used to identify both the seller name and buyer name fields of interest 522, 524, and 632, 642 across documents. Similarly, anchor elements 560, 670 "TOTAL:" is present in both documents, as is the information element 562, 672 for the actual amount. The anchor elements 560, 670, therefore, can be used across the documents 500, 600 for extracting the associated data even though the location of the anchor 670 and information element 672 are shifted from document 500. The "self" type anchor 634 for "Phone" is also consistent across the documents, but a similar anchor is not present for the "Buyer:" anchor element 640.

In various embodiments, the lack of flexible anchor element 540 "Items:" and the different formatting of the information element 660, data table, in document 600 could prevent identification of the data in the table, however, a flexible anchor element 650 "Description" is available as anchor 545 in document 500. The data extraction system 130 can recognize anchor element 650 "Description" in both documents, and associate both anchor element 540 "Items:" and anchor elements 540, 650 "Description" with the information element 550, 660 table.

Figure 7:
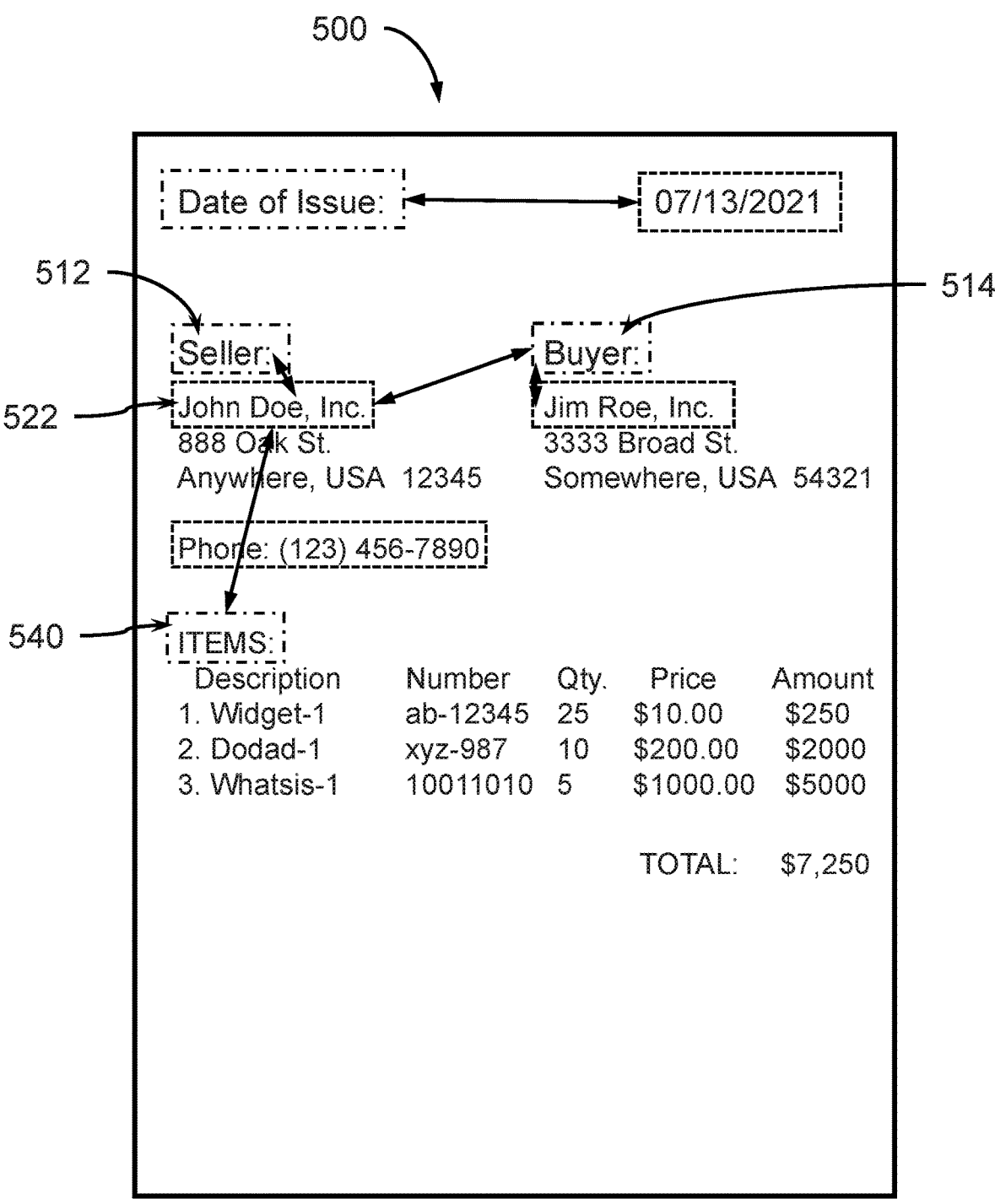
FIG. 7 shows an illustrative depiction of a document analysis for anchor identification and information element association, according to aspects of the present disclosure.

FIG. 7 shows an illustrative depiction of a document analysis for anchor identification and information element association, according to aspects of the present disclosure.

In various embodiments, a document 500 can have an information element 522 ("John Doe, Inc.") that has multiple type anchor elements specified by a user, 512 "Seller:", 514 "Buyer:" and 540 "Items:".

Figure 8:
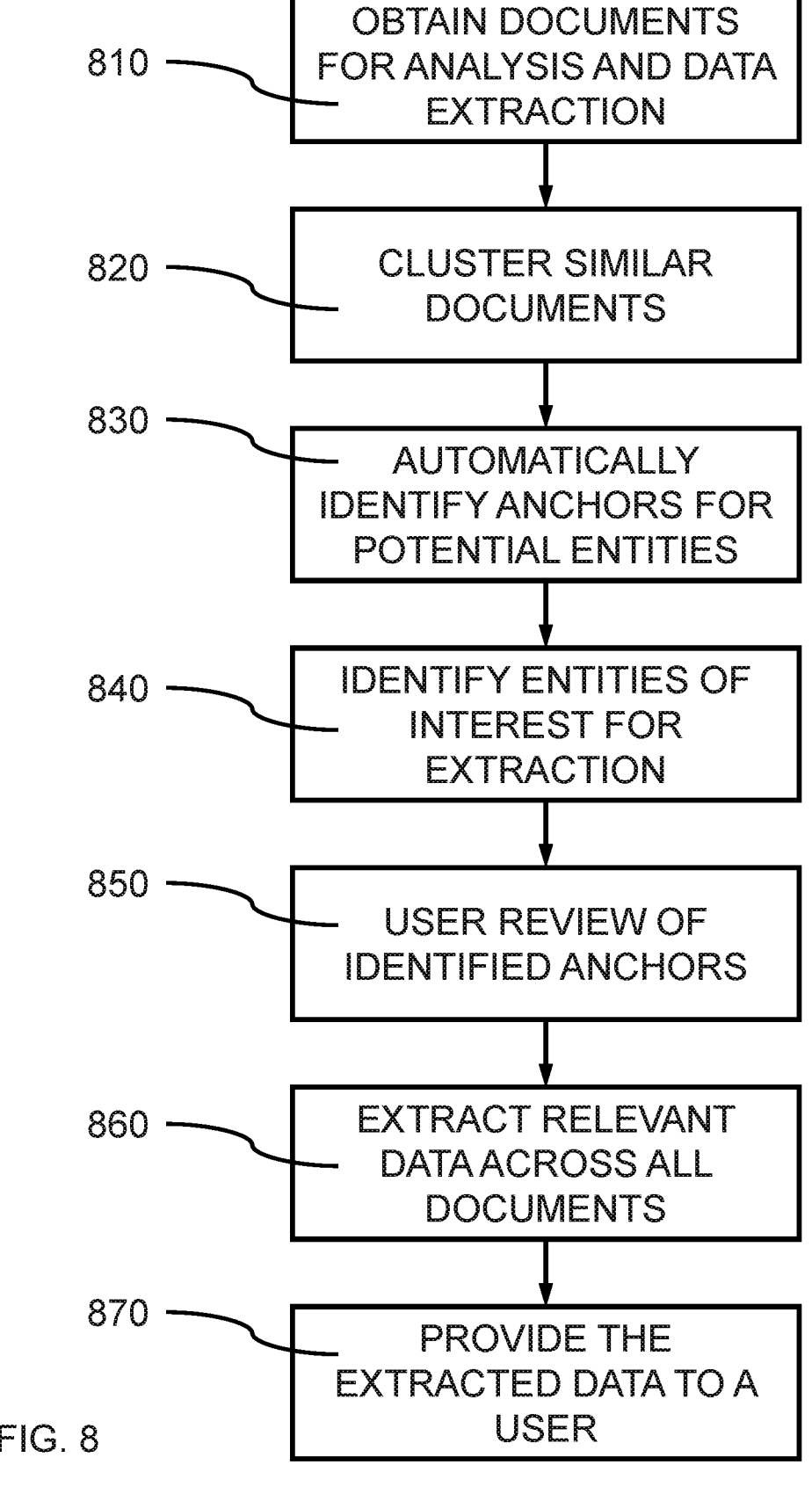
FIG. 8 shows an illustrative depiction of a method of anchor identification and data extraction, according to aspects of the present disclosure.

FIG. 8 shows an illustrative depiction of a method of anchor identification and data extraction, according to aspects of the present disclosure.

At operation 810, a plurality of documents can be obtained and identified for analysis and data extraction, where the plurality of documents can be identified or submitted by a user to a data extraction system. The documents can be unstructured or semi-structured documents, for example, PDF documents. The documents can contain similar data that can be identified by anchor elements present in each of the documents, where the anchor elements do not have to be consistent between documents. The data extraction system can include a machine learning model trained to identify information elements and anchor elements.

In various embodiments, the plurality of documents can be uploaded by a user from a user's device. The user can upload, for example, "N" heterogeneously formatted documents, for example, as a mixture of invoices, contracts, healthcare reports, etc., where "N" is the number of documents.

At operation 820, the data extraction system can analyze the plurality of documents to identify similarities, and can cluster the documents based on the similarities. The documents can be analyzed and clustered using a trained neural network (e.g., a support vector machine (SVM)). For example, the system clusters similarly structured documents together, where there are three resulting clusters, one for each of the invoices, contracts, and healthcare, and identifies "one best/representative" candidate document within each cluster to begin selective extraction.

In various embodiments, the data extraction system can cluster documents having the same format(s) based on a similarity measure, for example, Density-Based Spatial Clustering of Applications with Noise (DBSCAN) to group similarly structured documents together. Clustering Similarly Structured Documents together from uploaded documents, for example, could generate an "invoices cluster" and a "healthcare-cluster" (like separating apples and oranges from a fruit basket), where Invoice-type documents would form a separate cluster from the patient healthcare documents.

At operation 830, the data extraction system can automatically identify flexible anchor element candidates for potential information elements. The anchor candidates can be identified based on a plurality of relationships between document entries and each of the anchor candidates, where the anchor candidates can be hierarchically sorted based on calculated values for each of the different relationships. A set of anchor elements associated with each of the one or more identified information elements can be automatically identified using the trained machine learning model, wherein each of the anchor elements in the set are associated with an anchor type that describes a structure of the set of anchor elements.

In various embodiments, potential anchor candidates can be identified for each of the document clusters, where a particular identified anchor element may be consistent between documents in the same cluster. Potential anchor candidates can be determined for each of the detected document clusters. In particular, the system can look for repeating n-grams across all documents in a cluster that can then reliably locate and extract other dynamically updating entities around them. Entities that are stylistically (e.g., Font Weight >400-bolder text) and structurally (e.g., <H1,2,3,4> or <Title>-like tags) indicative of titles and headings can be scored higher than other entities such as <Span> and <P>.

At operation 840, information elements can be identified, where the information elements can be identified by a user based on one of the documents in a cluster. The information elements can be identified in one or more of the documents, and selected based on the data to be extracted from the plurality of documents.

In various embodiments, once the anchor candidates are determined, the system can automatically associate the most appropriate anchor from the candidate list with the selected information element, when the user selects the desired information elements from a document. For example, for a desired information element indicated as a date, "Jan. 1, 2021", a suitable anchor could be the label, "Invoice Date:". The user can select a desired information element, for example, "Items" table, and may selectively extract the "Description", "Qty", and the "Gross worth" columns only.

In various embodiments, a document can be preprocessed to identify and extract different information elements, for example, "text," tables", "figures", where for example, pre-processing can automatically extract content and structural information from the documents (e.g., PDF documents) that may be native or scanned, and output the extracted content in a structured JavaScript Object Notation (JSON) format.

For the text labels in the documents: "Shipping Date:", "Mail Date:" and "Invoice Date:", the system can determine their string values to compare and distinguish between the text labels; whereas, if only the values (e.g., 20/12/2012) are used, then the learned anchor rule can help distinguish between them. For example, if "20/12/2012" is anchored to "Seller" and named "Invoice Date", then during multi-document extraction, "Seller" can be traced to some other date (e.g., "29/12/2012") by applying the learned extraction rule.

In various embodiments, the relationships between a selected information element and an anchor candidate can include, but not be limited to, distance, reading order, structure, style, and/or semantic similarity. Once computed, the system can quantify and normalize each of the above features to a [0-1] scale.

For each of the anchor candidates, the system can compute one or more of the following features:

Distance Vector (Magnitude):

In various embodiments, a pixel distance between the information element and each anchor candidate can be determined. Shorter distances, i.e., nearby anchors, can be more highly weighted, as they are more likely to be semantically relevant and also consistently expected to exist in the same relative position.

The Distance Vector (magnitude) can be normalized based on the closest (e.g., normalized score=1) and furthest (e.g., normalized score=0) anchors to the information element.

Distance Vector (Angle):

In various embodiments, an angle (e.g., in degrees) between the information element and each anchor candidate can be determined. Angles around 0, 90, 180, 270 degrees can be more highly weighted, as a suitable anchor will often be above, below, to the left, or to the right of the information element, rather than along a diagonal or some arbitrary angle.

The Distance Vector (angle) can be normalized based on their proximity to the 0, 90, 180, 270-degree thresholds, for example, an anchor that is located 85 degrees to an information element.

These values can then categorized into 4 categories.

Style (Font Weight):

In various embodiments, a difference between the Font Weight of the information element and each anchor candidate can be determined. Anchor candidates with a different font weight (e.g., bolder text) can be more highly weighted, as they are more likely to be a relevant title or heading.

The Style (Font Weight) can be normalized based on the maximum and minimum font weights used within that document section and the difference in font weight between the information element and the anchor.

Style (Font Size):

In various embodiments, a difference between the Font Sizes of the information element and each anchor candidate can be determined. Anchor candidates with a different font-size (e.g., larger text) can be more highly weighted, as they are more likely to be a relevant title or heading.

The Style (Font Size) can be normalized based on the maximum and minimum font sizes used throughout within that document section and the difference in font size between the information element and the anchor.

Structure:

In various embodiments, a difference between the HTML-like structural identity of the information element and each anchor candidate can be determined. Anchor candidates with a different HTML tag can be more highly weighted, as such tags are more likely to be a relevant title or heading. For example, if an information element has a <P> tag, then an anchor candidate with a <SPAN> tag is scored a 0 because of the structural similarity to the <P> tag; whereas an anchor candidate with a structurally superior <H1> tag is scored a 1.

Structure can be normalized based on the structural level difference between the information element and the anchor. For example, if the information element is a <P> tag, then an anchor candidate with a <SPAN> tag, because of its structural similarity to <P> is scored a 0; but another anchor candidate with a structurally superior <H1> tag is scored a 1.

Semantics:

In various embodiments, a semantic similarity between the information element and each anchor candidate can be determined. Higher similarity scores can be more highly weighted, as they are semantically more relevant. In some cases, the similarity scores are already from [0, 1] and hence already normalized.

In various embodiments, the above discussed feature scores can be summed up to compute an overall score for the relationships between the anchors and information elements. The candidate anchor with the highest score can be assigned to the corresponding information element, as the most appropriate anchor for it.

At operation 850, the user can review the automatically identified anchor candidates to determine if the anchor candidates are properly associated with the selected information elements.

According to embodiments of the present disclosure, a user may utilize a user interface to override one or more of the system-determined anchors. The user may accept or reject each of the anchor candidate suggestions, where the data extractor can receive an anchor selection input from the user. The user can specify anchor(s) by interactively annotating directly on the document through a graphical user interface (GUI). The system can implement the user identified anchors and indicate how successful each of the chosen anchor elements are, when applied across the documents (e.g., the anchor was successfully applied on 11 out of 15 documents).

In various embodiments, the data extraction system can learn from the user-defined anchors and apply a revised strategy for information element identification and data extraction. The system can infer this by reverse-engineering the most important feature for determining anchors based on the user's annotation. For example, if the user chooses the nearby term, "Date:" as an anchor for the "Jan. 1, 2022" information element; and if the ranking of "Date:" is recognized as having the highest value for the "Distance Vector (magnitude)" and "Semantics" scores, then these features can be adjusted to be weighted higher than the other metrics, for example, Distance (angle), Structure, Style (Font Size) and Style (Font Weight) for re-computing the overall scores of the other anchor candidates. This re-learning strategy can be used for annotating semantically relevant entities within a document and preparing a dataset for other learning-based approaches.

At operation 860, the selected anchor elements and identified information elements can be used to extract relevant data across all of the plurality of documents. Each document can be scanned for the selected anchors, and the located anchors can be used to identify the associated information element. The data identified by the information element can be read by the data extraction system and stored for presentation to the user for analysis and calculations.

At operation 870, the extracted data can be provided to a user by the data extraction system. The extracted data can be provided in a predetermined format, for example, a file format, a printed format, or an on-screen format.

In various embodiments, three types of metadata can be identified: flexible anchor elements, information elements, and the relationship between the anchors and entities. The metadata can be stored outside of the document.

In various embodiments, a neural network, for example, a convolutional neural network (CNN) or transformer-based model, can be trained to identify flexible anchor elements for user indicated information elements. In various embodiments, a hard-coded software model may be used to identify flexible anchor elements for user indicated information elements.

In various embodiments, the plurality of documents may be stored in a JSON format for receipt, analysis, and data extraction by a data extraction system 130. The information contained in the JSON format may be used to identify flexible anchors and information elements within and between documents, for example, pixel distance, font size, font weight, etc.

Table 1 shows a non-limiting example of a JSON formatted file.

JSON (JavaScript Object Notation) is a language that is commonly used for data storage and transfer. JSON is based on the JavaScript programming language. HTML (Hypertext Markup Language) is a language that is used to create the structure and content of web pages. It may be used with CSS (Cascading Style Sheets) to style the page, and JavaScript to add interactivity. If there are millions of records that are stored somewhere separately and retrieved when needed by an electronic document or webpage, the records can be saved in a format (e.g., JSON, XML, a data interchange format) for sending and receiving those records. Document and web applications are developed using languages such as java script, so the use of JSON can simplify the way of structuring information, such that the information (e.g., documents, webpages, etc.) can interact more easily with these applications. JSON can handler various data types, and be parsed by a standard JavaScript function.

TABLE 1

```
"elements": {
  "box-0": {
    "id": "box-0",
    "text": "Invoice no: 33931957 ",
    "path": "//Documents/Sect/H1",
    "bounds": [48.11999951171, 803.5200042724, 197.1763458251,
```

TABLE 1-continued

```
    814.7760009765],
    "page": 0,
    "fontsize": 12.0
    "fontWeight": 700
  },
  "box-1": {
    "id": "box-0",
    "text": "Invoice no: 33931957 ",
    "path": "//Documents/Sect/H1",
    "bounds": [48.11999951171, 803.5200042724, 197.1763458251,
    814.7760009765],
    "page": 0,
    "fontsize": 12.0
    "fontWeight": 700
  },
  "box-1": {
    "id": "box-0",
    "text": "Invoice no: 33931957 ",
    "path": "//Documents/Sect/H1",
    "bounds": [48.11999951171, 803.5200042724, 197.1763458251,
    814.7760009765],
    "page": 0,
    "fontsize": 12.0
    "fontWeight": 700
  },
```

Once identified, each entity can be assigned an "id", for example, "box-0". This can include, "text"; and an extracted text entity, "Invoice no: 33931957". A "path" can be identified by: "path"; and an extracted entity. "//Documents/Sect/H1", indicating the structural hierarchical path of this element relative to the root, where, "//Document" is the root, "/Sect" is a section, "and "H1" is a level-1 heading, similar to HTML terminologies.

Other fields can be described as: "bounds": The pixel coordinates of the element's bottom-left with regard to the bottom-left of the page; "page": The page number where the element is; "fontSize": Size of the text, in pts; "fontWeight": How bold is the text; generally, a value of 100 means light, 400 is regular, 700 is bold.

In various embodiments, a Document Object Model (like HTML) can be created by unflattening the "path" property above, e.g., "Document" is the root, with "Sect" and "Sect [2]" as two sections; with low-level elements such as "H1" (heading), "P" (paragraph), and "P[2]" (another paragraph).

A "magnitude" key under the "inter_element_distance_vectors" object can capture the pixel distance between all N "elements" extracted from the document. This metric helps explain "how far" each of the elements are from one another. The "bounds" of each element can be used to create an N×N matrix. For example, in Table 2 shown below, Element 1 (first row) is about 24.45 pixels (px) (second item) away from Element 2.

The "direction" property under the same "inter_element_distance_vectors" object can capture the angle between each of the N "elements" extracted from the document. This can identify "where" an element is relative to the other elements. The "bounds" of each element can be used to create a N×N matrix. For example, in Table 2 shown below, Element 1 (first row) is located at −90 degrees (second item) to Element 2—which means it is positioned vertically above).

These mappings can locate the element's "id" from its "text" and vice versa. The "text_id_mapping" can be an array because the same text can occur multiple times in the document, and hence have a different "id" for each occurrence. See Table 2 below.

TABLE 2

| "text_id_mapping": { | "id_text_mapping": { |
|---|---|
| "Invoice no: 12456262 ": ["box-0"], | "box-0": "Invoice no: 12456262 ", |
| "Date of issue: ": ["box-1"], | "box-1": "Date of issue: ", |
| "07/12/2022 ": ["box-2"], | "box-2": "07/12/2022 ", |
| "Seller: ": ["box-3"], | "box-3": "Seller: ", |
| "Williams and Sons ": ["box-4"], | "box-4": "Williams and Sons ", |
| "655 Stephanie Inlet ": [box-5], | "box-5": "655 Stephanie Inlet ", |
| "East James, DC 00603 ": [box-6], | "box-6": "East James, DC 00603 ", |
| "Tax Id: 999-73-7345 ": [box-7], | "box-7": "Tax Id: 999-73-7345 ", |
| "IBAN: GB44WCRF642292 ": [box-8], | "box-8": "IBAN: GB44WCRF642292 ", |
| "Client: ": [box-9], | "box-9": "Client: ", |

In various embodiments, a clustering algorithm can be used to cluster similarly structured documents together. One cluster may represent, for example, 30 similarly structured PDF invoices.

In various embodiments, the "elements"-related information has been obtained for these invoices separately. The elements may be looped through across all invoices within this cluster and the frequency of the occurrence of each text counted. For example, "Invoice no: 33931957" has appeared only once across 30 invoices, and appears to be a unique identifier; whereas, "Date of issue:" has appeared in all 30 invoices. This can generate a count for each element. See Table 3.

TABLE 3

| "element_text_counts": { |
|---|
| "Invoice no: 12456262 ": 1, |
| "Date of issue: ": 30, |
| "07/12/2022 ": 1, |
| "Seller: ": 30, |
| "Williams and Sons ": 1, |
| "655 Stephanie Inlet ": 1, |
| "East James, DC 00603 ": 1, |
| "Tax Id: 999-73-7345 ": 1, |
| "IBAN: GB44WCRF642292 ": 1, |
| "Client: ": 30, |

From Table 3 "element_text_counts", the most common and frequent texts can be identified as potential "anchor" candidates. These high count "anchor" candidates are the special elements looked for when assigning "anchors" to the elements of user interest.

In various embodiments, the algorithm can be executed and pre-assign potential anchors to each element. In various embodiments, the 2nd, 3rd, 4th, . . . , $N^{th}$ elements are ranked from next-best candidates to the worst candidate. When the user manually assigns an anchor, overriding the system-determined anchor, the system looks-up this list and sees where "the highest rank", appears, e.g., comes up the earliest.

Training and Evaluation

FIG. 9 shows an illustrative depiction of a method of training an anchor identifier model, according to aspects of the present disclosure.

At operation 910, a set of training documents can be identified, where the training documents include ground truth flexible anchor elements for training an anchor identifier model based on a neural network. The plurality of training documents can have different formats and fields, where the documents are labeled for training the anchor identifier model. A training component can identify training documents with ground truth labels.

At operation 920, the training documents can be clustered based on format and usage, where the documents can include labels indicating ground truth categories for clustering. A training component can cluster the training documents.

At operation 930, information elements can be identified in the training documents, where the information elements can be pre-identified and labeled in the training documents to specify the data fields to be associated with predicted anchors. The anchor identifier model can be trained to predict one or more flexible anchor elements to be associated with the predetermined information elements. A training component can identify entities of interest in the training documents.

At operation 940, the anchor identifier model can predict flexible anchor elements to be associated with the identified information elements, where the predicted anchors are based on one or more learnable metrics. The parameters of the anchor identifier model can adapt weight parameters for the learned metrics. A training component can automatically predict anchors for each entity.

At operation 950, the predicted anchors can be compared to the ground truth anchors of the training documents. A training component can compare identified anchors with ground truth anchors of the training documents.

At operation 960, a loss function can be calculated for the comparison of the predicted values to the ground truth values. A training component can calculate a loss for the difference for predicted anchors to the ground truth values.

Figure 10:
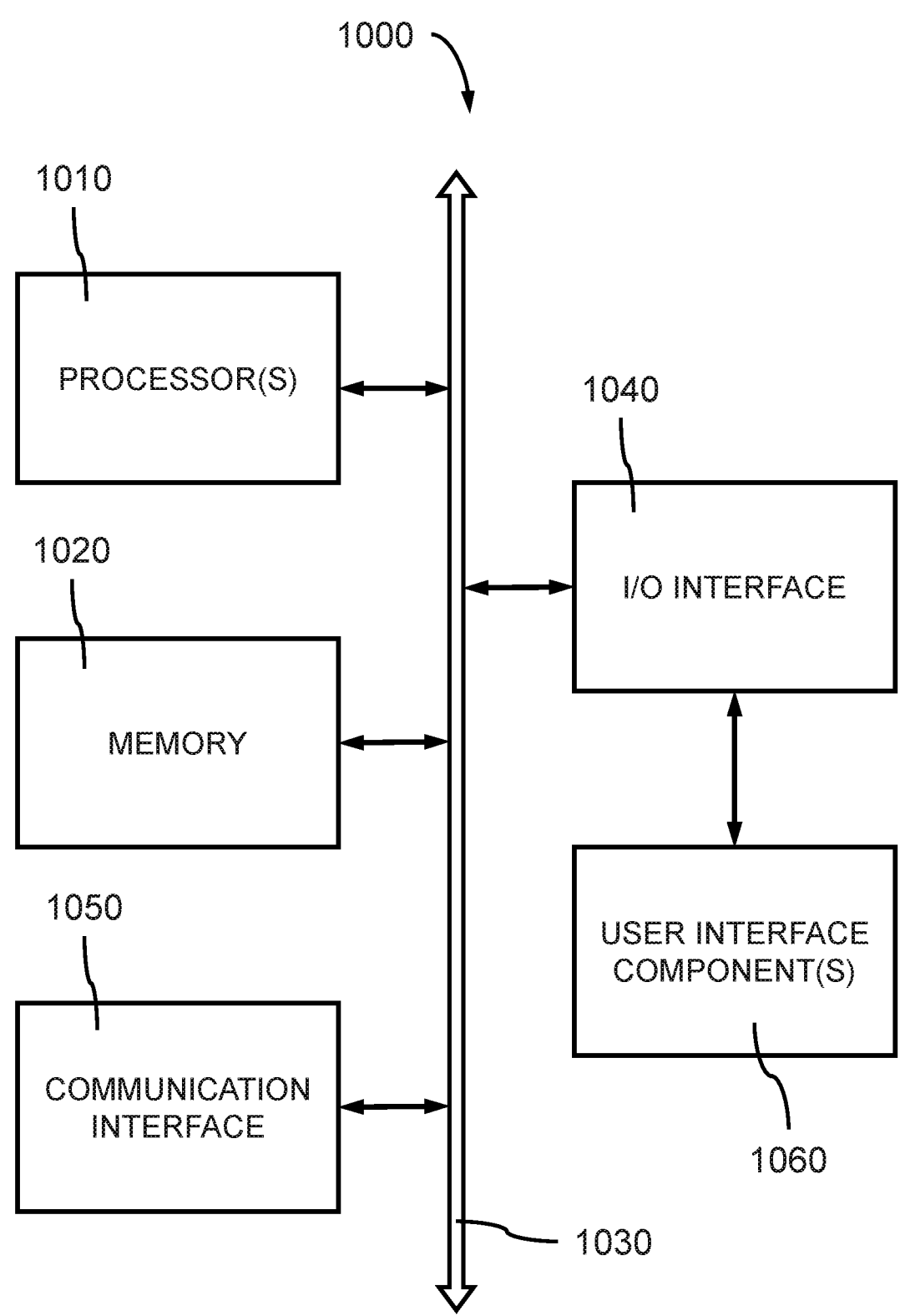
FIG. 10 shows an example of a computer system, according to aspects of the present disclosure.

At operation 970, the parameters of the anchor identifier model can be updated based on the loss function calculations to reduce the discrepancy between the ground truth anchors and the predicted anchors. The anchor identifier model can be further trained to further reduce the calculated errors. A training component can update the anchor identification model based on the loss. Accordingly, the anchor identifier model can be trained to identify flexible anchor elements that include an anchor type indicating a relationship between the anchor elements and information elements FIG. 10 shows an example of a computer system, according to aspects of the present disclosure.

In an aspect, the computer device 1000 includes processor(s) 1010, memory subsystem 1020, communication interface 1050, I/O interface 1040, user interface component(s) 1060, and channel 1030. In various embodiments, a computer device 1000 can be configured to perform the operations described above and illustrated in FIG. 1-9.

In some embodiments, computing device 1000 is an example of, or includes aspects of, data extractor 200 (or data extraction apparatus) of FIG. 2. In some embodiments, computing device 1000 includes one or more processors 1010 that can execute instructions stored in memory subsystem 1020 for identifying flexible anchors in a document; associating information elements with the anchor(s); and extracting data for the information elements for analysis and calculations, where the data includes attributes corresponding to the information elements.

According to some aspects, computing device 1000 includes one or more processors 1010. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1010 is configured to operate a memory array using a memory controller. In other cases, a memory controller is integrated into a processor 1010. In some cases, a processor 1010 is configured to execute computer-readable instructions stored in a memory to perform various functions. In some embodiments, a processor 1010 includes special-purpose components for modem processing, baseband processing, digital signal processing, or transmission processing.

According to some aspects, memory subsystem 1020 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory subsystem 1020 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1050 operates at a boundary between communicating entities (such as computing device 1000, one or more user devices, a cloud, and one or more databases) and channel 1030 (e.g., bus) and can record and process communications. In some cases, communication interface 1050 is provided to enable a processing system coupled to a transceiver (e.g., a transmitter and/or a receiver). In some examples, the transceiver is configured to transmit (or send) and receive signals for a communications device via an antenna.

According to some aspects, user interface component(s) 1060 enable a user to interact with computing device 1000. In some cases, user interface component(s) 1060 include an audio device, such as an external speaker system, an external display device such as a display screen, an input device (e.g., a remote control device interfaced with a user interface directly or through the I/O controller), or a combination thereof. In some cases, user interface component(s) 1060 include a GUI.

According to some aspects, I/O interface 1040 is controlled by an I/O controller to manage input and output signals for computing device 1000. In some cases, I/O interface 1040 manages peripherals not integrated into computing device 1000. In some cases, I/O interface 1040 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component(s) 1060, including, but not limited to, a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infra-red, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ.

Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a set of documents including a first document and a second document having a different format from the first document, wherein an information element is located in each document of the set of documents;

determining that a first anchor element for the information element is present in the first document and that a second anchor element different from the first anchor element is present in the second document, wherein the first anchor element has an anchor type and a relationship type, wherein the anchor type indicates whether the first anchor element can be used to locate the information element in the first document, wherein the relationship type describes a relationship between the first anchor element and the information element and is selected from a predetermined set of relationship types including a position type and a structural hierarchy type, wherein the position type indicates a distance or a direction between the first anchor element and the information element, and wherein the structural hierarchy type indicates a location of the information element within a document object model;

extracting information corresponding to the information element from the first document and the second document, wherein a first part of the information is extracted from the first document based on the first anchor element, the anchor type, and the relationship type, and wherein a second part of the information is extracted from the second document based on the second anchor element; and displaying the extracted information to a user.

2. The method of claim 1, further comprising:

identifying a plurality of anchor candidates for locating the information element, wherein the first anchor element is selected from the plurality of anchor candidates.

3. The method of claim 2, further comprising:

displaying the plurality of anchor candidates to the user; and receiving an anchor selection input from the user, wherein the first anchor element is selected based on the anchor selection input.

4. The method of claim 1, wherein:

the anchor type comprises a single anchor type, a multiple anchor type, a hierarchical anchor type, a self-anchor type, or a combination anchor type.

5. The method of claim 1, wherein:

the predetermined set of relationship types further comprises a style type or a semantic similarity type.

6. The method of claim 1, further comprising:

locating the information element in the first document based on the first anchor element, the anchor type, and the relationship type, wherein the information is extracted from the information element.

7. The method of claim 6, further comprising:

determining that the relationship type comprises the position type; and identifying a position relationship between the information element and the first anchor element, wherein the information element is located based on the position relationship.

8. The method of claim 6, further comprising:

determining that the relationship type comprises the structural hierarchy type; and identifying a structural relationship between the information element and the first anchor element, wherein the information element is located based on the structural relationship.

9. The method of claim 6, further comprising:

determining that the relationship type comprises a style type; and identifying a style relationship between the information element and the first anchor element, wherein the information element is located based on the style relationship.

10. The method of claim 6, further comprising:

determining that the relationship type comprises a semantic type; and identifying a semantic relationship between the information element and the first anchor element, wherein the information element is located based on the semantic relationship.

11. The method of claim 1, further comprising:

determining that the anchor type comprises a multiple anchor type; and identifying an additional anchor element, wherein a set of anchor elements includes the first anchor element and the additional anchor element, and the information is extracted based on the first anchor element and the additional anchor element.

12. The method of claim 1, further comprising:

determining that the anchor type comprises a hierarchical anchor type; and identifying an additional anchor element having a hierarchical relationship to the first anchor element, wherein a set of anchor elements includes the first anchor element and the additional anchor element, and the information is extracted based on the first anchor element and the additional anchor element.

13. The method of claim 1, further comprising:

providing the first document and the information element to a machine learning model, wherein the first anchor element is identified based on an output of the machine learning model.

14. A non-transitory computer-readable medium storing executable instructions, which when executed by a processing device, cause the processing device to perform operations comprising:

identifying a plurality of documents including a first document and a second document having a different format from the first document, wherein an information element is located in each document of the plurality of documents;

generating a set of anchor elements associated with the information element using a machine learning model trained to determine that a first anchor element for the information element is present in the first document and that a second anchor element different from the first anchor element is present in the second document, wherein the first anchor element has an anchor type and a relationship type, wherein the anchor type indicates whether the first anchor element can be used to locate the information element in the first document, wherein the relationship type describes a relationship between the first anchor element and the information element and is selected from a predetermined set of relationship types including a position type and a structural hierarchy type, wherein the position type indicates a distance or a direction between the first anchor element and the information element, and wherein the structural hierarchy type indicates a location of the information element within a document object model;

extracting information corresponding to the information element from the first document and the second document, wherein a first part of the information is extracted from the first document based on the first anchor element, the anchor type, and the relationship type, and wherein a second part of the information is extracted from the second document based on the second anchor element; and generating data from the plurality of documents based on the set of anchor elements, wherein the data includes attributes corresponding to the information element.

15. The non-transitory computer-readable medium of claim 14, wherein the executable instructions further cause the processing device to perform operations comprising:

clustering the plurality of documents to obtain a document cluster, wherein the data is generated based on the document cluster.

16. The non-transitory computer-readable medium of claim 14, wherein:

the plurality of documents includes unstructured documents.

17. The non-transitory computer-readable medium of claim 14, wherein the executable instructions further cause the processing device to perform operations comprising:

receiving a query from a user;

analyzing the query using a natural language processor; and generating a response to the query based on the data.

18. A system, comprising:

a memory component; and one or more processing devices coupled to the memory component, the one or more processing devices configured to perform operations comprising:

obtaining a set of documents including a first document and a second document having a different format from the first document, wherein an information element is located in each document of the set of documents;

determining, using an anchor component, that a first anchor element for the information element is present in the first document and that a second anchor element different from the first anchor element is present in the second document, wherein the first anchor element has an anchor type and a relationship type, wherein the anchor type indicates whether the first anchor element can be used to locate the information element in the first document, wherein the relationship type describes a relationship between the first anchor element and the information element and is selected from a predetermined set of relationship types including a position type and a structural hierarchy type, wherein the position type indicates a distance or a direction between the first anchor element and the information element, and wherein the structural hierarchy type indicates a location of the information element within a document object model;

extracting, using an extraction component, information corresponding to the information element from the first document and the second document, wherein a first part of the information is extracted from the first document based on the first anchor element, the anchor type, and the relationship type, and wherein a second part of the information is extracted from the second document based on the second anchor element; and displaying, via a user interface, the extracted information to a user.

19. The system of claim 18, further comprising:

a natural language model configured to process queries related to the first document.

20. The system of claim 18, wherein:

the anchor component comprises a machine learning model trained to identify anchor elements from an unstructured document.

* * * * *